US010325403B2

(12) United States Patent
Pharr et al.

(10) Patent No.: US 10,325,403 B2
(45) Date of Patent: Jun. 18, 2019

(54) IMAGE BASED RENDERING TECHNIQUES FOR VIRTUAL REALITY

(71) Applicant: Google Inc., Mountain View, CA (US)

(72) Inventors: Matthew Milton Pharr, San Francisco, CA (US); Manfred Ernst, Sunnyvale, CA (US); Puneet Lall, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 223 days.

(21) Appl. No.: 15/246,040

(22) Filed: Aug. 24, 2016

(65) Prior Publication Data

US 2018/0061119 A1   Mar. 1, 2018

(51) Int. Cl.
*G06T 15/20*   (2011.01)
*G06T 15/00*   (2011.01)
*G06T 15/04*   (2011.01)

(52) U.S. Cl.
CPC .......... *G06T 15/205* (2013.01); *G06T 15/005* (2013.01); *G06T 15/04* (2013.01)

(58) Field of Classification Search
CPC ...... G06T 15/205; G06T 15/005; G06T 15/04
See application file for complete search history.

(56) References Cited

U.S. PATENT DOCUMENTS 6,954,202 B2   10/2005   Han et al.
8,447,096 B2   5/2013   Gunnewiek et al.
2002/0158880 A1*   10/2002   Williams ............... G06T 15/04
                                                               345/582

(Continued)

FOREIGN PATENT DOCUMENTS

EP   1128331 A2   8/2001
EP   2180449 A1   4/2010

(Continued)

OTHER PUBLICATIONS

"Intro to Computer Graphics: Texture and Other Mapping", retrieved on Jan. 12, 2016 from https://www.cs.uic.edu/~jbell/CourseNotes/ComputerGraphics/TextureMapping.html, 4 pages.

(Continued)

*Primary Examiner* — King Y Poon
*Assistant Examiner* — Vincent Peren
(74) *Attorney, Agent, or Firm* — Brake Hughes Bellermann LLP

(57) ABSTRACT

In one general aspect, a computer-implemented method can include identifying a plurality of pixel samples included in a layered depth image (LDI) representation of a scene for rendering in a three-dimensional (3D) image in a virtual reality (VR) space, grouping, by a processor, a subset of the plurality of pixel samples into a block of data, including extracting each pixel sample included in the subset of the plurality of pixel samples from the LDI representation of the scene for inclusion in the block of data based on an error metric associated with the respective pixel sample, creating, by the processor, a texture map for a block of data, the texture map being associated with the block of data, storing the block of data and the texture map, and triggering a rendering of the 3D image in the VR space using the block of data and the texture map.

20 Claims, 14 Drawing Sheets

(56) References Cited

U.S. PATENT DOCUMENTS

| | | | | |
|---|---|---|---|---|
| 2004/0012563 | A1* | 1/2004 | Papakipos | G06T 1/20 345/157 |
| 2011/0304619 | A1* | 12/2011 | Fu | G06T 17/00 345/420 |
| 2013/0121564 | A1* | 5/2013 | Kitamura | G06T 17/00 382/154 |
| 2014/0300941 | A1* | 10/2014 | Chang | G03H 1/02 359/9 |

FOREIGN PATENT DOCUMENTS

| | | |
|---|---|---|
| EP | 2562722 A1 | 2/2013 |
| EP | 2611182 A2 | 7/2013 |

OTHER PUBLICATIONS

Bommes, et al, "Mixed-Integer Quadrangulation", Proceedings of ACM SIGGRAPH 2009 TOG, vol. 28 Issue 3, Aug. 2009, 10 pages.

Duan, et al, "Compression of the Layered Depth Image", IEEE Data Compression Conference, Mar. 2001, pp. 331-340, 10 pages.

Duan, et al, "Compression of the Layered Depth Image", IEEE Transactions on Image Processing, vol. 12, No. 3, Mar. 2003, pp. 365-372, 8 pages.

Fussell, "Texture Mapping", CS384G—Computer Graphics, University of Texas at Austin, Fall 2010, 22 pages.

Gortler, et al, "Rendering Layered Depth Images", Microsoft Research Technical Report, Mar. 19, 1997, 11 pages.

Heckbert, "Fundamentals of Texture Mapping and Image Warping", Master's Thesis, University of California, Jun. 17, 1989, 94 pages.

Jantet, "Layered Depth Images for Multi-View Coding" Ph.D. Thesis defense, Rennes, 2012, 56 pages.

Popescu, et al, "Efficient Warping for Architectural Walkthroughs Using Layered Depth Images", IEEE Visualization, Oct. 18-23, 1998, 6 pages.

Shade, et al, "Layered Depth Images", SIGGRAPH 98, Jul. 19-24, 1998, 13 pages.

Yoon, et al. "Multiple Color and Depth Video Coding Using a Hierarchical Representation", IEEE Transactions on Circuits and Systems for Video Technology, vol. 17, No. 11, Nov. 2007, pp. 1450-1460, 11 pages.

Yoon, et al, "Preprocessing of Depth and Color Information for Layered Depth Image Coding", PCM 2004, LNCS 3333, 2004, pp. 622-629, 8 pages.

Trapp, et al., "Efficient Representation of Layered Depth Images for Real-time Volumetric Tests", retrieved on Jun. 1, 2008 from http://cgs.hpi.uni-potsdam.de/publications/Public/2008/TD08b/, Jun. 2008, pp. 9-16.

International Search Report and Written Opinion for PCT Application No. PCT/US2017/045103, dated Oct. 24, 2017, 17 pages.

Shade, et al., "Tiling Layered Depth Images", SIGGRAPH 2000, retrieved on Oct. 9, 2017 from http://mentallandscape.com/Papers_02uw.pdf, Jul. 28, 2000, 10 pages.

Combined Search and Examination Report under Sections 17 and 18(3) for United Kingdom Application No. 1713374.5, dated Jan. 25, 2018, 7 pages.

\* cited by examiner

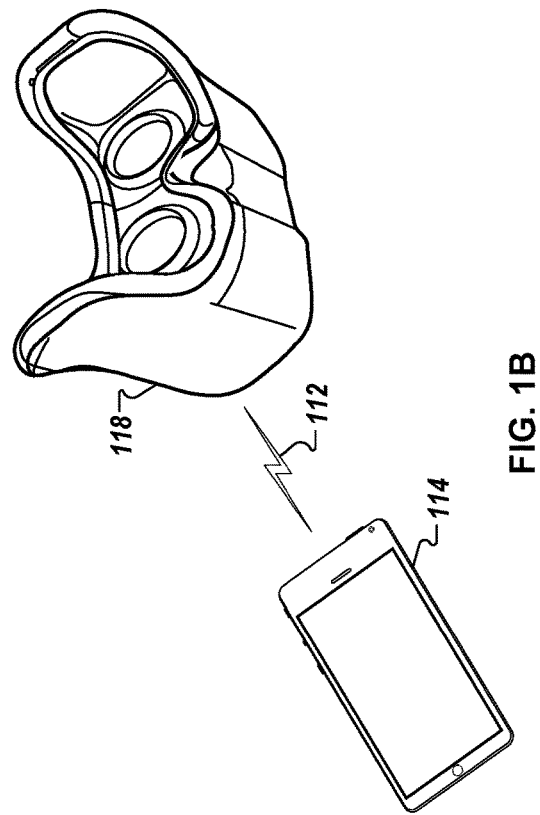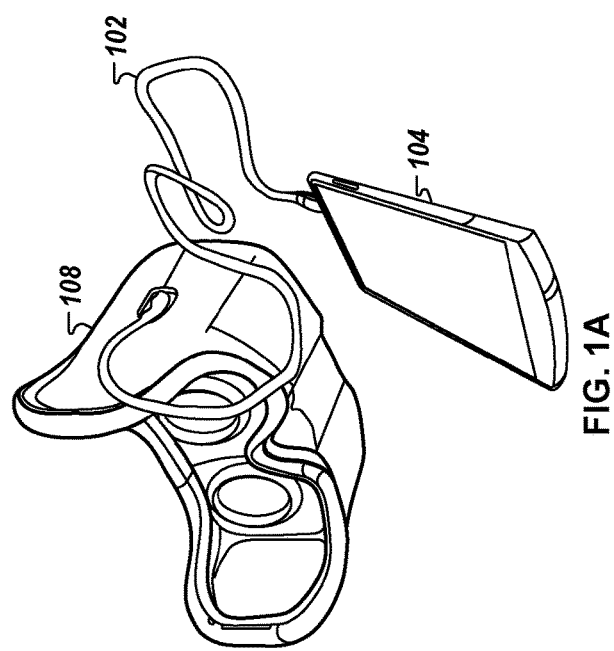

900

```
┌─────────────────────────────────────────────────────────────────┐
│ Identify a plurality of pixel samples included in a layered depth│
│ image (LDI) representation of a scene for rendering in a three- │
│ dimensional (3D) image in a virtual reality (VR) space.         │
│                                                             902 │
└─────────────────────────────────────────────────────────────────┘
                                  ↓
┌─────────────────────────────────────────────────────────────────┐
│ Group a subset of the plurality of pixel samples into a block of data.│
│                                                             904 │
└─────────────────────────────────────────────────────────────────┘
                                  ↓
┌─────────────────────────────────────────────────────────────────┐
│ Create a texture map for a block of data.                       │
│                                                             906 │
└─────────────────────────────────────────────────────────────────┘
                                  ↓
┌─────────────────────────────────────────────────────────────────┐
│ Store the block of data and the associated texture map.         │
│                                                             908 │
└─────────────────────────────────────────────────────────────────┘
                                  ↓
┌─────────────────────────────────────────────────────────────────┐
│ Trigger the rendering of the 3D image in the VR space using the block of│
│ data and the associated texture map.                            │
│                                                             910 │
└─────────────────────────────────────────────────────────────────┘
```

FIG. 9

IMAGE BASED RENDERING TECHNIQUES FOR VIRTUAL REALITY

TECHNICAL FIELD

This description generally relates to scene representations in a virtual reality (VR) space.

BACKGROUND

Image based rendering (IBR) techniques can be used to represent and render objects. IBR techniques can be beneficial when rendering geometrically complex scenes. In addition or in the alternative, IBR techniques can be beneficial when shading geometrically complex scenes (e.g., when global illumination algorithms are used).

In some cases, as the geometric complexity of an object increases the time required to render the object can also increase. For example, an IBR technique can be texture mapping. In another example, a Layered Depth Image (LDI) can be an image-based technique that can be used for representing and rendering objects with complex geometries. The selection of an IBR technique for representing and rendering objects can be based on the complexity of the object. The IBR technique selection can be determined in order to minimize image rendering times.

SUMMARY

In one general aspect, a computer-implemented method can include identifying a plurality of pixel samples included in a layered depth image (LDI) representation of a scene for rendering in a three-dimensional (3D) image in a virtual reality (VR) space, grouping, by a processor, a subset of the plurality of pixel samples into a block of data, the grouping including extracting each pixel sample included in the subset of the plurality of pixel samples from the LDI representation of the scene for inclusion in the block of data based on an error metric associated with the respective pixel sample, creating, by the processor, a texture map for a block of data, the texture map being associated with the block of data, storing the block of data and the associated texture map, and triggering a rendering of the 3D image in the VR space using the block of data and the associated texture map.

Implementations can include one or more of the following features, alone or in combination with one or more other features. For example, the processor can be a Graphics Processing Unit (GPU). Triggering the rendering of the 3D image in the VR space using the block of data and associated texture map can include triggering a rasterizing of the block of data, and triggering an applying of the associated texture map. The block of data can be represented by a planar tile. Grouping a subset of the plurality of pixel samples into a block of data can further include determining whether the error metric for a pixel sample is greater than an error threshold value, and not including the pixel sample in the subset of the plurality of pixel samples for grouping into the block of data based on determining that the error metric for the pixel sample is greater than the error threshold value. The error threshold value can be based on a region around an original camera position where the LDI representation of the scene is considered valid. The method can further include optimizing, by the processor, parameters associated with the block of data, the optimizing minimizing a total partitioning error for the subset of the plurality of pixel samples included in the block of data. The grouping of the subset of the plurality of pixel samples can be performed by a quadrangulation algorithm. The grouping of the subset of the plurality of pixel samples can be performed by a partitioning algorithm.

In another general aspect, a computing device can include a screen configured to display image data, a display interface configured to provide the image data to the screen, a GPU buffer configured to store blocks of data, and a graphics processing unit (GPU). The GPU can be configured to identify a plurality of pixel samples included in a layered depth image (LDI) representation of a scene for rendering in a three-dimensional (3D) image in a virtual reality (VR) space, group a subset of the plurality of pixel samples into a block of data, the grouping including extracting each pixel sample included in the subset of the plurality of pixel samples from the LDI representation of the scene for inclusion in the block of data based on an error metric associated with the respective pixel sample, create a texture map for a block of data, the texture map being associated with the block of data, store the block of data and the associated texture map in the GPU buffer, and trigger a rendering of the 3D image in the VR space. The rendering can include rasterizing the block of data, and applying the associated texture map. The GPU can be further configured to provide the rendered 3D image to the display interface as the image data for display on the screen.

Implementations can include one or more of the following features, alone or in combination with one or more other features. For example, the block of data can be represented by a planar tile. Grouping a subset of the plurality of pixel samples into a block of data can further include determining whether the error metric for a pixel sample is greater than an error threshold value, including the pixel sample in the subset of the plurality of pixel samples for grouping into the block of data based on determining that the error metric for the pixel sample is not greater that the error threshold value, and not including the pixel sample in the subset of the plurality of pixel samples for grouping into the block of data based on determining that the error metric for the pixel sample is greater than the error threshold value. The error threshold value can be based on a region around an original camera position where the LDI representation of the scene is considered valid. The GPU can be further configured to optimize parameters associated with the block of data, the optimizing minimizing a total partitioning error for the subset of the plurality of pixel samples included in the block of data. The GPU can be further configured to perform a quadrangulation algorithm when grouping the subset of the plurality of pixel samples into the block of data. The GPU can be further configured to perform a partitioning algorithm when grouping the subset of the plurality of pixel samples into the block of data.

In yet another general aspect, a non-transitory, machine-readable medium has instructions stored thereon. The instructions, when executed by one or more processors, can cause a computing device to identify, by the computing device, a plurality of pixel samples included in a layered depth image (LDI) representation of a scene for rendering in a three-dimensional (3D) image in a virtual reality (VR) space, group a subset of the plurality of pixel samples into a block of data, the grouping including extracting each pixel sample included in the subset of the plurality of pixel samples from the LDI representation of the scene for inclusion in the block of data based on an error metric associated with the respective pixel sample, create a texture map for a block of data, the texture map being associated with the block of data, store the block of data and the associated texture map, and trigger, by the computing device, a rendering of the 3D image in the VR space using the block of data and the associated texture map.

Implementations can include one or more of the following features, alone or in combination with one or more other features. For example, the grouping of the subset of the plurality of pixel samples is performed by one of a quadrangulation algorithm or a partitioning algorithm. The instructions, when executed by the one or more processors, that cause the computing device to group a subset of the plurality of pixel samples into a block of data further includes instructions that when executed by the one or more processors cause the computing device to calculate an error threshold value based on a region around an original camera position where the LDI representation of the scene is considered valid, and include a pixel sample in the subset of the plurality of pixel samples for grouping into the block of data based on determining that the error metric for the pixel sample is greater than the error threshold value. The instructions, when executed by the one or more processors, further cause the computing device to optimize parameters associated with the block of data, the optimizing minimizing a total partitioning error for the subset of the plurality of pixel samples included in the block of data.

The details of one or more implementations are set forth in the accompanying drawings and the description below. Other features will be apparent from the description and drawings, and from the claims.

BRIEF DESCRIPTION OF THE DRAWINGS

FIG. 1A is a diagram that illustrates a mobile computing device connected to (interfacing with) a VR headset using a cable.

FIG. 1B is a diagram that illustrates a mobile computing device connected to (interfacing with) a VR headset using a wireless connection.

FIG. 9 is a flowchart that illustrates a method for rendering a layered depth image (LDI) representation of a scene as a three-dimensional (3D) image in a virtual reality (VR) space.

Like reference symbols in the various drawings indicate like elements.

DETAILED DESCRIPTION

Figure 1C:
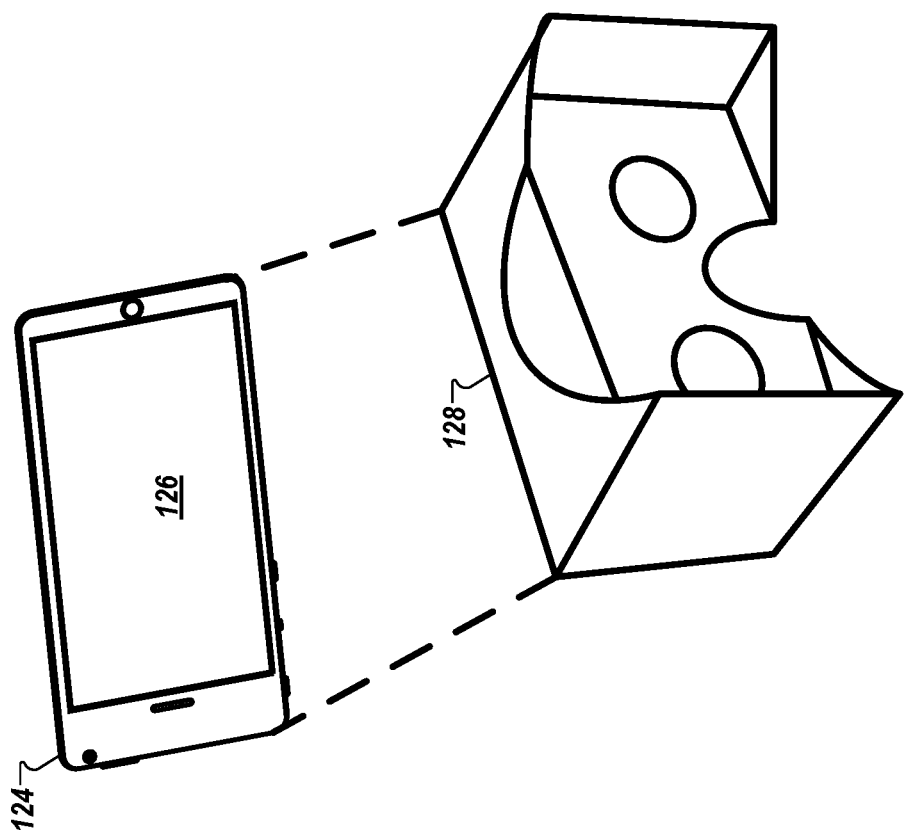
FIG. 1C is a diagram that illustrates a VR headset that includes (incorporates, houses) a mobile computing device.

A Layered Depth Image (LDI) can be a pixel-based representation of an image. Each pixel included in a LDI representation of an object can include an arbitrary number of samples. Each sample can include a color value, a depth value, and a surface normal value. The surface normal value can provide an orientation for the sample. Each sample can represent a small, colored surface element in the image space. Because LDIs store information about objects behind those that are immediately visible to the camera, it is possible to generate new views of a scene from viewpoints different from but close to the original camera viewpoint, since information about objects that are visible from these new views is available.

An LDI can include an array of pixels viewed from a single camera position or perspective. The array of pixels can include multiple pixels along each line of sight of the camera from a particular camera position. A representation of a LDI pixel can include color information that includes alpha channel information, depth information (a distance between the pixel and the camera), and other attributes that can support the rendering of the LDI in a three-dimensional (3D) space. For example, the alpha channel information can be used to determine an opacity level for the pixel.

An LDI representation of an image can include multiple layers at each pixel location in the image, each layer being at a particular distance from a camera. Each layer can include a distribution of pixels representative of the image. In some cases, the distribution of pixels in layers that are farthest from the camera can tend to be sparse. Because each pixel can have multiple attribute values (e.g., color and depth), the use of an LDI representation of an image can enable rendering of multiple views of the image at new camera positions or perspectives.

Use of an LDI representation of an object (or image) can be an efficient way to render the object as a three dimensional (3D) object in a virtual reality (VR) space for viewing with six degrees of freedom (6DOF). The LDI representation of the 3D object allows for the rendering of the object from different perspectives in the VR space. Each pixel included in the 3D object can be drawn (rendered) from a different perspective in the 3D space, projecting the pixel into a new viewpoint. For example, each pixel can be considered a disc in the VR space. As the viewpoint for the pixel changes in the VR space, the disc can be viewed from each new viewpoint or perspective in the VR space.

In some implementations, a VR headset can include a Graphics Processing Unit (GPU), and a processor, a controller, and/or a central processing unit (CPU) that can perform the rendering of the image or object in 3D in the VR space. In these implementations, however, the GPU may be challenged when rendering the 3D object in the VR space due to the large number of pixels (e.g., millions of pixels) included in the 3D object and the large amount of data associated with the 3D object. The GPU may not have sufficient bandwidth to render the different perspectives of the 3D object in real-time in the VR space for viewing with 6DOF. In addition or in the alternative, the performance of a hardware rasterizer included in the GPU may not be sufficient to render the different perspectives of the 3D object in real-time in the VR space for viewing with 6DOF.

The need exists, therefore, for efficient systems and methods for real-time rendering of an object as a 3D object in VR space in cases where computing resources may be limited.

FIG. 1A is a diagram that illustrates a mobile computing device 104 connected to (interfacing with) a VR headset 108 using a cable 102. The mobile computing device 104 can connect to (communicate with) the VR headset 108 using one or more high-speed communication protocols such as, for example, USB 2.0, USB 3.0 and USB 3.1. In some cases, the mobile computing device 104 can connect to (communicate with) the VR headset 108 using an audio/video interface such as, for example, High-Definition Multimedia Interface (HDMI). In some cases, the mobile computing device 104 can connect to (communicate with) the VR headset 108 using a DisplayPort Alternate mode for a USB Type-C standard interface. The DisplayPort Alternate mode can include a high-speed USB communication interface and DisplayPort functions.

The cable 102 can include an appropriate connector on either end for plugging into the VR headset 108 and the mobile computing device 104. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors.

FIG. 1B is a diagram that illustrates a mobile computing device 114 connected to (interfacing with) a VR headset 118 using a wireless connection 112 without the need for a cable (e.g., the cable 102 as shown in FIG. 1A). The mobile computing device 114 can connect to (communicate with) the VR headset 118 using the wireless connection 112 by implementing one or more high-speed communication protocols such as, for example, WiFi, Bluetooth, or Bluetooth Low Energy (LE).

FIG. 1C is a diagram that illustrates a VR headset 128 that includes (incorporates, houses) a mobile computing device 124. In some implementations, the VR headset 128 can include a removable computing device (e.g., the mobile computing device 124). For example, a mobile computing device of a user (e.g., the mobile computing device 124) can be placed inside of (within) the VR headset 128 when the user wishes to immerse themselves in a VR space. In some cases, the mobile computing device 124 can also be removed from the VR headset 128, for example, when a user is done immersing themselves in the VR space.

In some implementations, a mobile computing device (e.g., the mobile computing device 124) can be permanently included (incorporated within, housed in) a VR headset (e.g., the VR headset 128). The mobile computing device 124 can be incorporated within (housed within, be part of) a casing or frame of the VR headset 128. In some implementations, a display device 126 included in the mobile computing device 124 can be the display device for the VR headset 128. The mobile computing device 124 can provide the display or screen (e.g., the display device 126) for viewing by a user when interacting with a computer-generated, 3D environment (a VR space). In some implementations, the VR headset 128 can include a separate display device. In these implementations, the mobile computing device 124 can interface to the separate display device that is part of the VR headset 128.

Figure 1D:
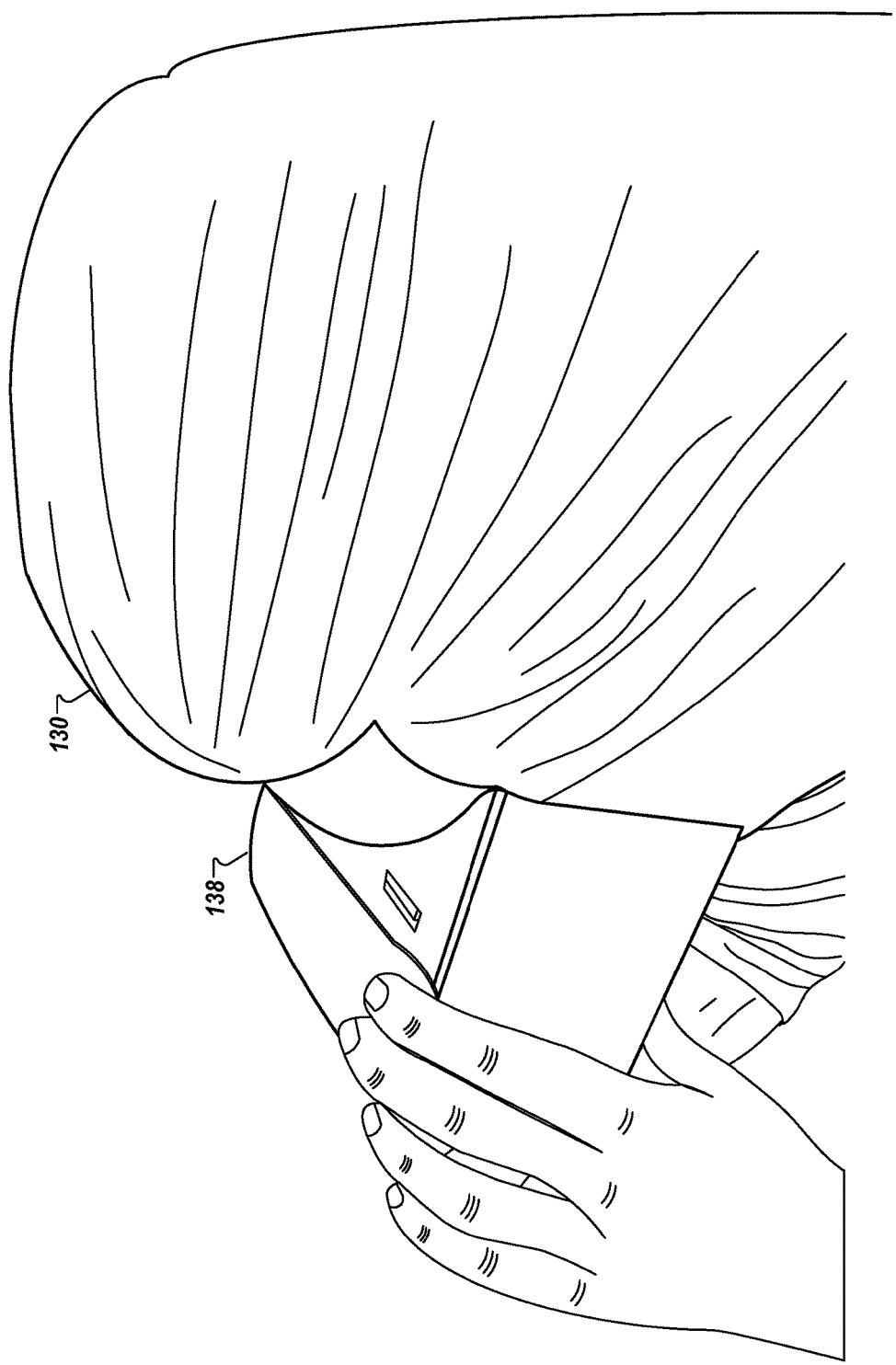
FIG. 1D is a diagram that shows a user wearing a VR headset.

FIG. 1D is a diagram that shows a user 130 wearing a VR headset 138. The VR headset 138 can be the VR headset 108, the VR headset 118, or the VR headset 128 as shown in FIGS. 1A-C, respectively. For example, referring to FIGS. 1A-C, a mobile computing device connected to and/or included in the VR headset 138 can execute one or more applications to provide a computer-generated, 3D environment (a VR space or experience) to the user 130 while wearing the VR headset 138.

Referring to FIGS. 1A-C, in some implementations, each mobile computing device (e.g., the mobile computing device 104, the mobile computing device 114, and the mobile computing device 124) can run one or more applications that can provide a VR experience to a user.

Figure 2:
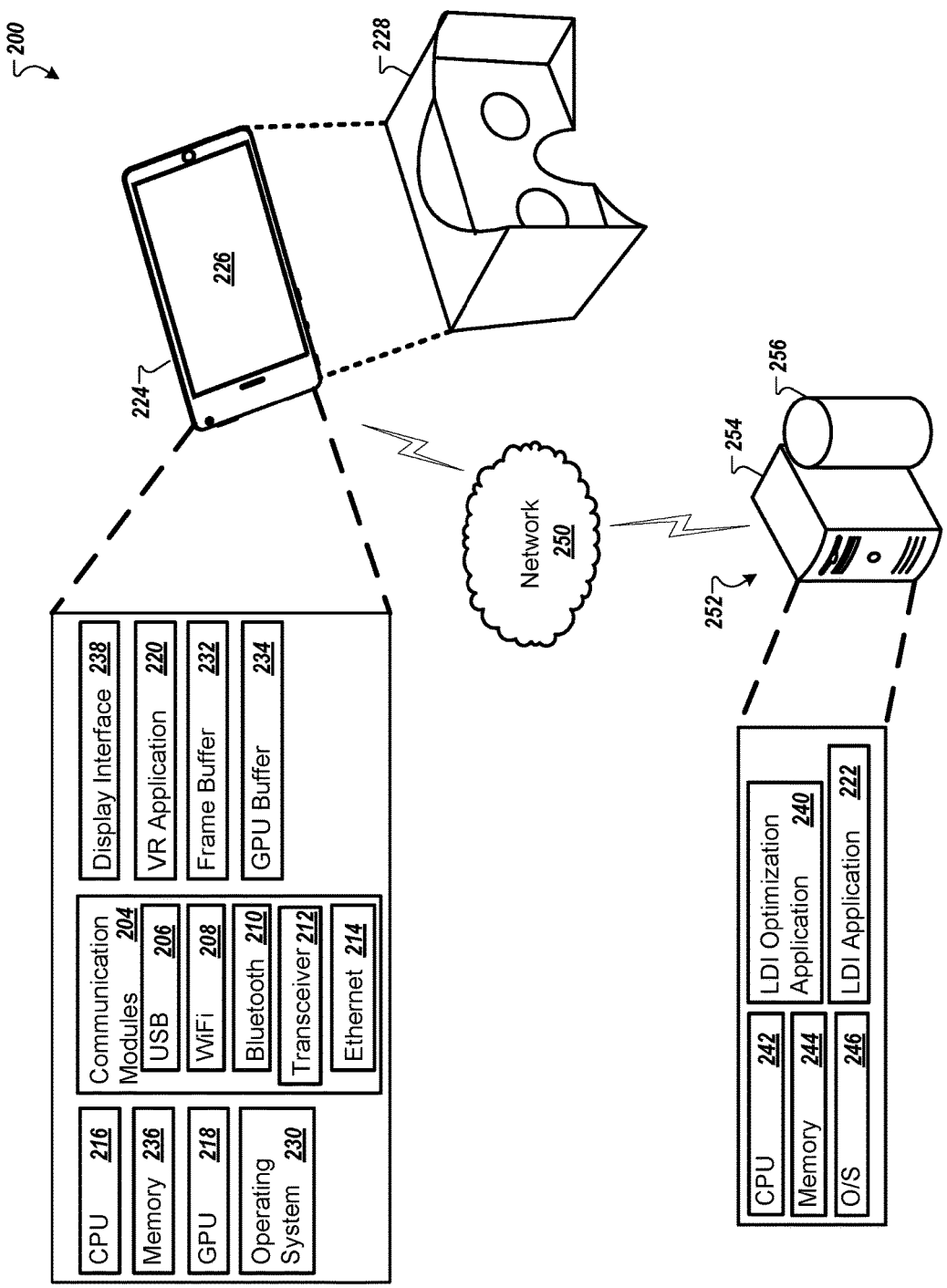
FIG. 2 is a block diagram of an example system for creating and interacting with a three dimensional (3D) virtual reality (VR) environment.

FIG. 2 is a block diagram of an example system 200 for creating and interacting with a three dimensional (3D) virtual reality (VR) environment. For example, FIG. 2 shows components that can be included in an example computing device 224 interfaced to and/or included within (housed in, incorporated in) a VR headset 228. Referring to FIGS. 1A-C, the computing device 224 can be the mobile computing device 104, the mobile computing device 114, and/or the mobile computing device 124. The VR headset 228 can be the VR headset 108, the VR headset 118, and/or the VR headset 128. The computing device 224 can include circuitry and software (applications) that can generate and provide image data and information on a display device included in the VR headset 228. In some implementations, as shown in FIG. 2, a display device (a screen 226) included in the computing device 224 can be the display device for the VR headset 228 when the computing device 224 is included in (is part of, is incorporated in) the VR headset 228. In some implementations, a screen included in the VR headset 228 can be the display device for the VR headset 228. In these implementations, the computing device 224 can connect to (interface with) the screen included in the VR headset 228.

The computing device 224 includes communication modules 204. The communication modules 204 can include, but are not limited to, a USB communication module 206, a WiFi communication module 208, a Bluetooth communication module 210, a transceiver 212, and an Ethernet (e.g., IEEE 802.3) communication module 214. The communication modules 204 can be used to establish connections and communications between the computing device 224 and one or more external networks (e.g., network 250), systems (e.g., computing system 252), and/or devices.

In addition or in the alternative, the computing device 224 can use one or more of the communication modules 204 to establish communications with (a connection to) a VR headset. In some implementations, one or more connectors included on the computing device 224 can connect to (interface with) connectors included on in a VR headset. For example, connecting (interfacing) the computing device 224 to a VR headset can allow the computing device 224 to provide image data and information for display on a display device included in the VR headset where the display device is not included on the computing device 224.

The computing device 224 can include a central processing unit (CPU) 216 and a graphics processing unit (GPU) 218. The CPU 216 can include one or more processors that can perform general computing operations for the computing device 224. For example, the CPU 216 can execute (run) one or more applications (e.g., a VR application 220) on the computing device 224. The one or more applications can be included in (stored in) a memory (e.g., memory 236). For example, the VR application 220 can render (create) a computer-generated, 3D environment (a VR space). The computing device 224, and specifically the CPU 216, can execute an operating system (O/S) 230.

The GPU 218 can include one or more processors that can perform graphics-specific operations on the computing device 224 such as image drawing, scaling, and rotation. For example, the GPU 218 can execute (run) one or more applications on the computing device 224. The GPU 218 can prepare image data and information for input to a display interface 238 for subsequent displaying on a display device (e.g., the screen 226).

The display interface 238 can prepare data representative of a 3D image for display on a display device. As described herein, the display interface 238 can provide the data representative of the 3D image to the screen 226 in implementations where the screen 226 is the display device for a VR headset. In implementations where the display device for the VR headset is not included in the computing device 224, the display interface 238 can provide the data representative of the 3D image to a screen or display device included in the VR headset but external to the computing device 224.

A frame buffer 232 can be one or more memory devices that can store a final rendered image for display on a display device (e.g., the screen 226). The display interface 238 can access and interface with the frame buffer 232 in order to provide the data representative of the 3D image to the display device (e.g., the screen 202).

A GPU buffer 234 can be one or more memory devices that can store pre-computed multiple LDI representations of a scene (multiple LDIs) from different viewpoints or perspectives, each of the multiple LDIs being for different parts of the scene. The GPU 218 can access the GPU buffer 234 to retrieve an LDI representation of an image. The GPU 218 can render the LDI representation of the image for input to the display interface 238 for display on the screen 226 as an image in a 3D VR space. In some implementations, the GPU 218 can include the GPU buffer 234. In some implementations, the GPU buffer 234 can be accessed by and interfaced to the GPU 218.

The system 200 includes a computer system 252 that can include one or more computing devices (e.g., server 254) and one or more computer-readable storage devices (e.g., a repository or database 256). The server 254 can include one or more processors (e.g., server CPU 242), and one or more memory devices (e.g., server memory 244). The computing device 224 can communicate with the computer system 252 (and the computer system 252 can communicate with the computing device 224) using the network 250. The server 254 can execute a server O/S 246, and one or more server applications including an LDI application 222 and an LDI optimization application 240.

For example, the LDI application 222 can generate or create an LDI for use by the VR application 220 when rendering a 3D image for the VR space. For example, the LDI optimization application 240 can include one or more algorithms that can be applied to an LDI in order to optimize (or improve) the rendering of the 3D image by the VR application 220 in the VR space. The algorithms and improvements are described in more detail later herein. In some implementations, the server 254 can be a workstation. In some implementations, the computer system 252 can be included in a data center. In some implementations, the LDI application 222 and/or the LDI optimization application 240 can be included in the computing device 224.

Figure 3:
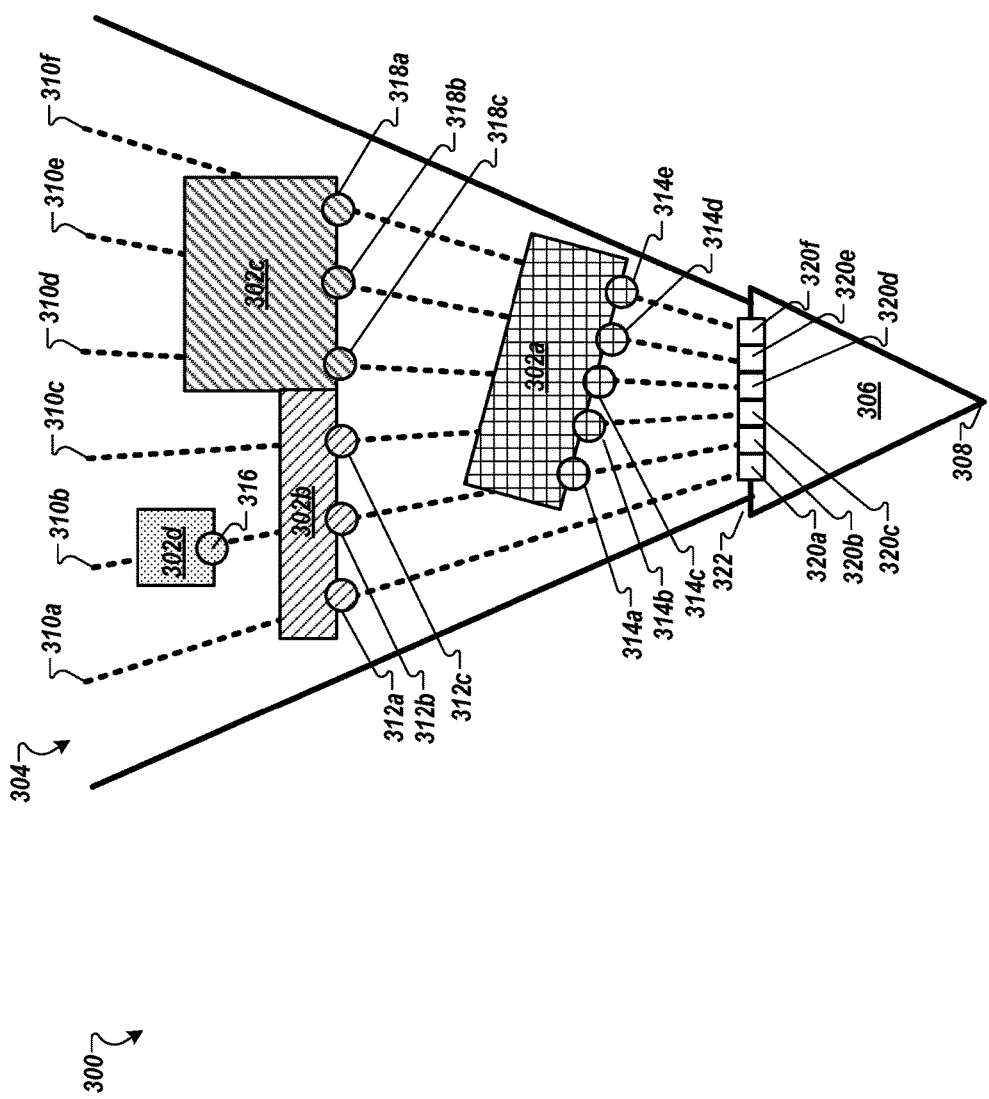
FIG. 3 is a diagram that illustrates objects included in a scene as viewed by a camera at a position.

FIG. 3 is a diagram 300 that illustrates objects 302a-d included in a scene 304 as viewed by a camera 306 at a position 308. The diagram 300 is a two-dimensional view of the scene 304. Though described in two-dimensions, the description of FIG. 3 included herein can be applied to a 3D scene.

The camera 306 can project an array of light rays 310a-f from the position 308. Each light ray 310a-f can be considered a line of sight for the camera 306 at the position 308. A light ray can intersect a single object or multiple objects. For example, light ray 310a intersects object 302c at point 312a and does not intersect any other objects in its line of sight. Light ray 310b intersects object 302a at point 314a, intersects the object 302c at point 312b, and intersects object 302d at point 316. Light ray 310c intersects the object 302a at point 314b and intersects the object 302c at point 312c. Light rays 310d-f intersect object 302a at points 314c-e, respectively, and intersect object 302b at points 318a-c, respectively. Each point (points 312a-c, points 314a-e, point 316, and points 318a-c) can be referred to as a sample that can be included in an LDI pixel. The scene 304 can be represented as an LDI that includes an array of LDI pixels 320a-f (LDI pixel array 322). For example, referring to FIG. 2, the LDI application 222 can create (generate) the LDI representation of the scene 304.

The number of intersection points along each light ray can be referred to as a number of layers for the light ray. For example, referring to the light rays 310a-f, points 314a-e and point 312a can be considered in a first layer of the LDI (scene 304), points 312b-c and points 318a-c can be considered in a second layer of the LDI (scene 304), and point 316 can be considered in a third layer of the LDI (scene 304).

Each LDI pixel 320a-f can have an arbitrary number of samples. The arbitrary number of samples can be based on the number of layers for a light ray, where each light ray can provide from zero points (or samples) to multiple points (multiple layers or samples). For example, an LDI pixel may include no samples if a light ray does not intersect any objects. LDI pixel 320a includes a single sample (point 312a). LDI pixels 320c-f include two points (or samples) each: point 314b and point 312c, point 314c and point 318a, point 314d and point 318b, and point 314e and point 318c, respectively. LDI pixel 320b includes three points (or samples): point 314a, point 312b, and point 316.

Each LDI pixel sample can include a color value. In some implementations, the color value can be a three-byte value (e.g., one byte for the red (R) color component, one byte for the blue (B) color component, and one byte for the green (G) color component). In some implementations, the color component of a color value can larger than one byte (e.g., each color component can be a 32-bit float value (e.g., a single precision floating-point format value)). Each LDI pixel sample can include a depth value. For example, the depth value can provide a location for the sample point within the LDI (e.g., the distance of the point from the position 308 of the camera 306). Each LDI pixel sample can include a value for a surface normal. For example, in a 3D VR space, a surface normal to a surface of an object at a particular point is a vector that is perpendicular to a tangent plane at the particular point. The depth value and surface normal can provide a location for and orientation of the LDI pixel sample in a 3D VR space. Each LDI pixel sample can include a sub-pixel position value. The inclusion of a sub-pixel position value effectively turns an LDI into a perspective-space point cloud with full precision for the sample positions in 3D space. For example, each LDI pixel sample can represent a colored, small surface element (e.g., a disc) floating in or suspended in a 3D VR space.

In some implementations, an LDI can be represented by a large number of LDI pixels. As shown in FIG. 3, an LDI (and in particular an LDI pixel) can store information about some objects (e.g., light ray intersection points) that are behind other objects that are immediately visible to a camera in a particular position. New views of the same scene from different viewpoints, which can be close to the original camera position and viewpoint, can be generated because information about objects that can be visible from these new viewpoints is available. For example, because the LDI pixel array 322 includes depth information for each LDI sample included in an LDI pixel, the scene 304 can be recreated (redrawn, regenerated) from a different viewpoint.

For example, millions of LDI pixels may be needed in order to generate a high quality (e.g., high-resolution) image in a 3D VR space. Referring to FIG. 2, as the perspective view of a user changes in the VR space, the LDI pixels are redrawn by the GPU 218, rendering an image for display in the VR space. The redrawing of a large number of pixels can affect the time it takes for the GPU 218 to render an LDI representation of an image. In addition or in the alternative, the amount of buffer memory used to store each pre-computed LDI representation of an image from multiple different viewpoints or perspectives can be quite large. The rendering time combined with the need for a large amount of buffer memory can negatively affect the performance and cost of a VR headset (e.g., referring to FIGS. 1A-D, the VR headset 138, the VR headset 108, the VR headset 118, and/or the VR headset 128).

In addition, a GPU (e.g., the GPU 218) can be efficient at processing and manipulating blocks of image data in parallel as opposed to serially processing millions of individual pixels of image data. In some implementations, therefore, it may be beneficial to combine multiple LDI pixels into a single block of data for improved and faster processing by a GPU (e.g., the GPU 218). For example, an LDI representation of an image can be divided into multiple blocks of data by combining LDI pixels into a group that can be represented by a single block of data. The number of blocks of data that can represent an LDI can be selected to provide an accurate representation of a scene while reducing the amount of data needed for the LDI representation of the image. The data blocks can represent the LDI in a compact manner that the GPU 218 can efficiently process.

Image-based processes and methods can be used to simplify a scene for rendering (drawing) in real time in 3D in a VR space. For example, one or more software applications running (executing) on a workstation, computer system, or on one or more servers included in a data center can process input scene information and data that may be complex, generating a less complex, simplified version of the scene for rendering (drawing) in real time in 3D in a VR space. In some cases, the simplified version of the scene may be valid for rendering on and viewing within a headbox or VR headset. The scene may look good or acceptable when viewed within the headbox. For example, referring to FIG. 2, the LDI application 222 and the LDI optimization application 240 can process the input scene information and generate the simplified version of the scene for rendering (drawing) in real time in 3D in a VR space by the VR application 220 included in the computing device 224.

For example, the LDI application 222 can generate images of a scene from various positions within a field of view in a VR headset (a headbox) (e.g., the VR headset 228). Each scene image can include a plurality of pixel samples or points that include associated color information, depth information, and a value for a surface normal. Each scene image can be assembled into a data structure (e.g., an LDI) that can be used in a representation of a simplified version of the scene for rendering (drawing) in real time in 3D in a VR space by the VR application 220. For example, the LDI optimization application 240, for each pixel sample, can create a polygon as an approximation for each pixel sample included in the data structure (e.g., the LDI). In some implementations, a quadrangulation algorithm, as described in more detail herein, can create the polygon approximations. In some implementations, an iterative partitioning algorithm, as described in more detail herein, can create the polygon approximations. The LDI optimization application 240 can generate a texture map for each polygon. Each polygon and its associated texture map can be combined to form a model (simplified representation) of the scene for rendering (drawing) in real time in 3D in a VR space by the VR application 220 included in the computing device 224. The algorithm executed by the VR application 220 when rendering the model of the scene can be based on the algorithm used to create the polygon representations.

Referring to FIG. 2, a GPU (e.g., the GPU 218) can be used to render (generate, draw) an LDI representation of an image (a scene) for output to a display device included in a VR headset. The GPU (e.g., the GPU 218) can render pre-computed multiple LDI representations of an image (multiple LDIs each being for different parts of an image or scene) from different viewpoints or perspectives. The stored LDI representations of the image can be intended for output to the display device. The display device can then display appropriate LDI representations of the image in the VR space based on a particular viewpoint or perspective.

An LDI representation of an image (a scene) can include a large number of pixels or discs that are redrawn as the perspective from which they are viewed changes in the VR space. This large number of pixels or discs and their associated data can impact the time it takes for the GPU (e.g., the GPU 218) to render an LDI representation of an image as well as the amount of memory (e.g., the GPU buffer 234) used to store the pre-computed multiple LDI representations of the image from the different viewpoints or perspectives.

A GPU (e.g., the GPU 218) can be efficient at processing texture mapped polygons as compared to individual points. In some implementations, multiple pixels or discs can be combined into a texture mapped polygon for processing by the GPU (e.g., the GPU 218). Dividing an LDI representation of an image into multiple texture mapped polygons can reduce the amount of time it takes the GPU (e.g., the GPU 218) to process the image data. The number of texture mapped polygons can be selected to provide an accurate representation of the image while reducing the amount of data needed for the LDI representation of the image. The number of texture mapped polygons can represent the LDI in a more efficient manner.

In some implementations, a quadrangulation algorithm can take an LDI pixel representation of an image as input. The quadrangulation algorithm can identify a plane (a planar tile in a 3D space) that includes multiple LDI pixel samples. The identified multiple LDI pixel samples can be included in a group. The group of the LDI pixel samples in the plane (the planar tile in a 3D space) can form a quadrilateral (or a polygon). Specifically, the quadrangulation algorithm can convert a group of LDI pixel samples included in a plane (or a planar tile) into a texture-mapped quadrilateral (or a texture-mapped polygon).

Referring to FIG. 2, the quadrangulation algorithm can be part of the LDI optimization application 240 included in the computing device 200. The quadrangulation algorithm can generate multiple texture-mapped quadrilaterals that can be stored, for example, in the GPU buffer 234. Each texture-mapped quadrilateral can include a texture map that can be applied (or mapped) to a surface of the quadrilateral when the quadrilateral is redrawn as part of an image in a 3D VR space. Texture mapping the group of LDI pixel samples included in the quadrilateral can add detail, surface texture, and/or color to the plane (the planar tile) in the 3D VR space.

In addition, the quadrangulation algorithm can identify one or more LDI pixel samples in the image that are not included in any plane and, therefore, are not grouped with any other LDI pixels. These LDI pixel samples can be stored as individual LDI pixels (or points) in the GPU buffer 234 along with the texture-mapped quadrilaterals. For example, an LDI that includes (is represented by) two million LDI pixel samples may be converted into 50,000 texture-mapped quadrilaterals and 50,000 LDI pixel samples. This representation of an LDI can include far fewer individual LDI pixel samples making for more efficient processing by a GPU (e.g., the GPU 218). The GPU 218 can more efficiently render a texture-mapped object (e.g., a quadrilateral or a polygon) in real-time in a VR space than a large number of individual LDI pixels. Use of a quadrangulation algorithm can reduce the number of individual LDI pixels the GPU 218 needs to render in real time in order to ensure the high frame rate needed to redraw an image in a VR space as a perspective view of a user changes in the VR space.

Figure 4:
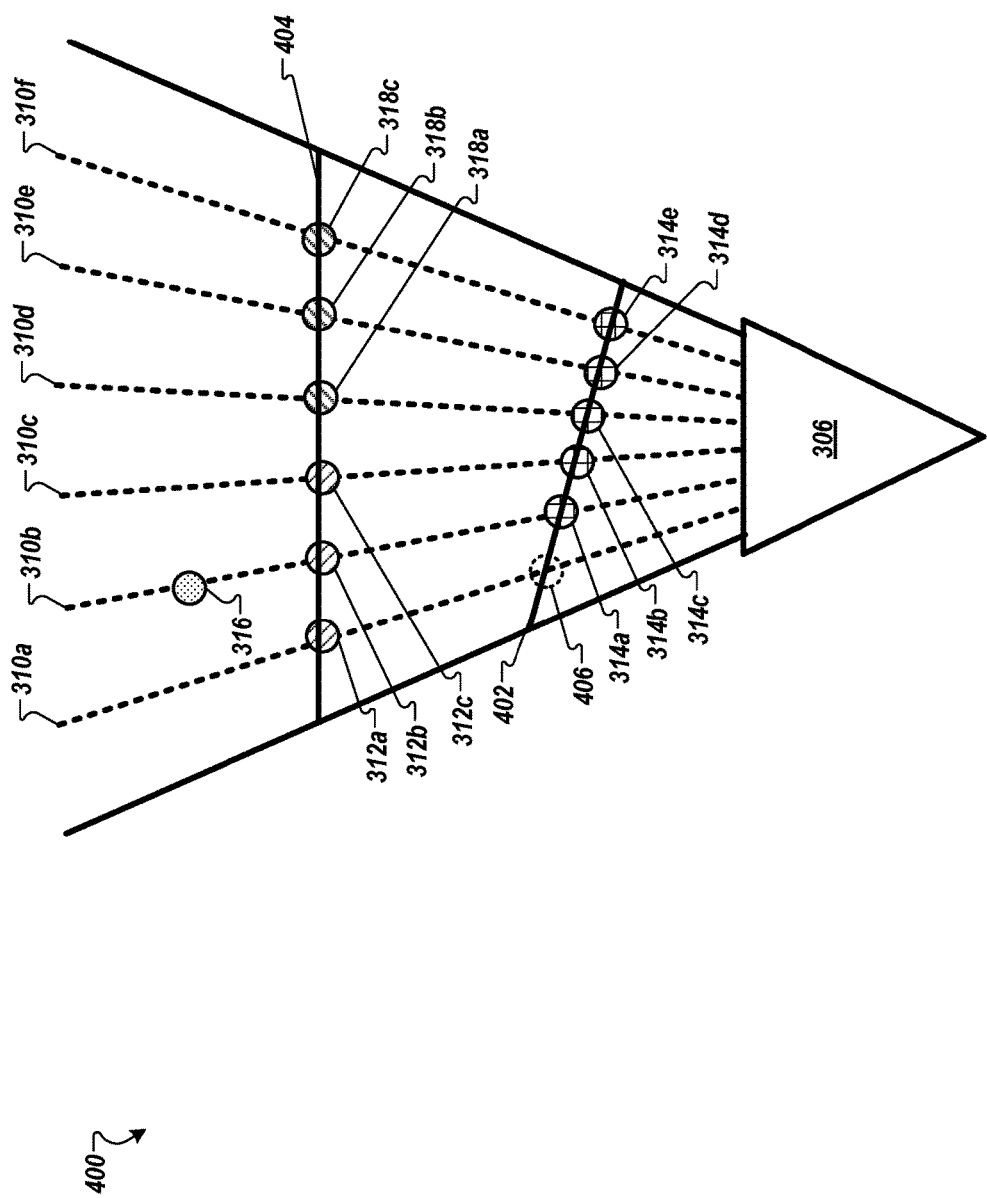
FIG. 4 is a diagram that illustrates example planar tiles where each planar tile includes a plurality of LDI pixel samples.

FIG. 4 is a diagram 400 that illustrates example planar tiles where each planar tile includes a plurality of LDI pixel samples. The diagram 400 is a two-dimensional view based on the scene 304 as shown in FIG. 3. Though described in two-dimensions, the description of FIG. 4 included herein can be applied to a 3D scene.

For example, referring to FIG. 3, the object 302a can be of a first color, the object 302b and the object 302c can be of a second color, and the object 302d can be of a third color. A planar tile 402 can be created from the points 314a-e. In the example shown in FIG. 4, the points 314a-e are all of the same color (a first color). In the example shown in FIG. 4, points 312a-c and points 318a-c are all of the same color (a second color). In some implementations, the color in a planar tile may not be a uniform color (e.g., the points included in a planar tile may not be the same color, the points included in a planar tile may not be uniform). The points included in a planar tile are located within the same plane.

For example, a quadrangulation algorithm can identify the points 314a-e, which are LDI pixel samples for the LDI pixel array 322, and extract the points 314a-e from an LDI representation of the scene 304 for inclusion in the planar tile 402. In the example shown in FIG. 4, the quadrangulation algorithm can create a texture-mapped quadrilateral that includes a texture map in the first color. In implementations where the color in a planar tile is not uniform, the quadrangulation algorithm can create a texture-mapped quadrilateral that includes a texture map where each pixel included in the texture map is of a different color. The quadrangulation algorithm can include a transparent pixel 406 in the texture map for the planar tile 402. The transparent pixel 406 can preserve a hole (the lack of an LDI pixel sample) in the planar tile 402 at that location in the LDI image.

A planar tile 404 can be created from the points 312a-c and points 318a-c, which are all of the same color (a second color). For example, the quadrangulation algorithm can identify the points 312a-c and the points 318a-c, which are LDI pixel samples for the LDI pixel array 322, and extract the points 312a-c and the points 318a-c from an LDI representation of the scene 304 for inclusion in the planar tile 404. In the example shown in FIG. 4, the quadrangulation algorithm can create a texture-mapped quadrilateral that includes a texture map in the second color. In implementations where the color in a planar tile is not uniform, the quadrangulation algorithm can create a texture-mapped quadrilateral that includes a texture map where each pixel included in the texture map is of a different color.

For example, the quadrangulation algorithm can identify the point 316 as an individual point because of a lack of proximity of other points of the third color that the quadrangulation algorithm could group into a planar tile.

Referring to FIG. 2, the quadrangulation algorithm will continue to identify and extract points from the LDI representation of a scene and create additional planar tiles. In addition, as the quadrangulation algorithm creates planar tiles it can also identify individual points that may not be included in a planar tile. The planar tiles and identified individual points can be stored in the GPU buffer 234 for later rendering by the GPU 218 and the VR application 220 for display on the screen 202 using the display interface 238.

A quadrangulation method (or algorithm) can use one or more criteria to determine how to group LDI pixel samples that are included in a particular plane into a single block of data. The criteria can include, for example, grouping LDI pixel samples that are in a particular proximity to one another into a block of data represented by a particular structure. For example, a group of LDI pixel samples can be included in a single plane. Pixels that fall within a 16 pixel×16 pixel square that is included in the plane can be considered a block of data. Multiple 16 pixel×16 pixel squares can form tiles that can represent the plane. As such, the quadrangulation algorithm can use a tile structure that groups the LDI pixel samples in a plane into 16 pixel×16 pixel tiles.

A quadrangulation algorithm can be implemented on each plane of the LDI representation of the scene. The quadrangulation algorithm can extract groups of LDI pixel samples that are included in the same plane and create a texture-mapped quad for the points. In many cases, a plane of the LDI representation of the scene can include pixel samples from different layers of the LDI.

The quadrangulation algorithm can use one or more criteria to determine how to group the LDI pixel samples in the plane. In a first implementation, for each plane, the quadrangulation algorithm can use a tile structure, grouping the LDI pixel samples in the plane into, for example, 16 pixel×16 pixel tiles. The quadrangulation algorithm can implement color texture mapping for each group of LDI pixel samples creating a texture-mapped quad for the group of LDI pixel samples.

Figure 5:
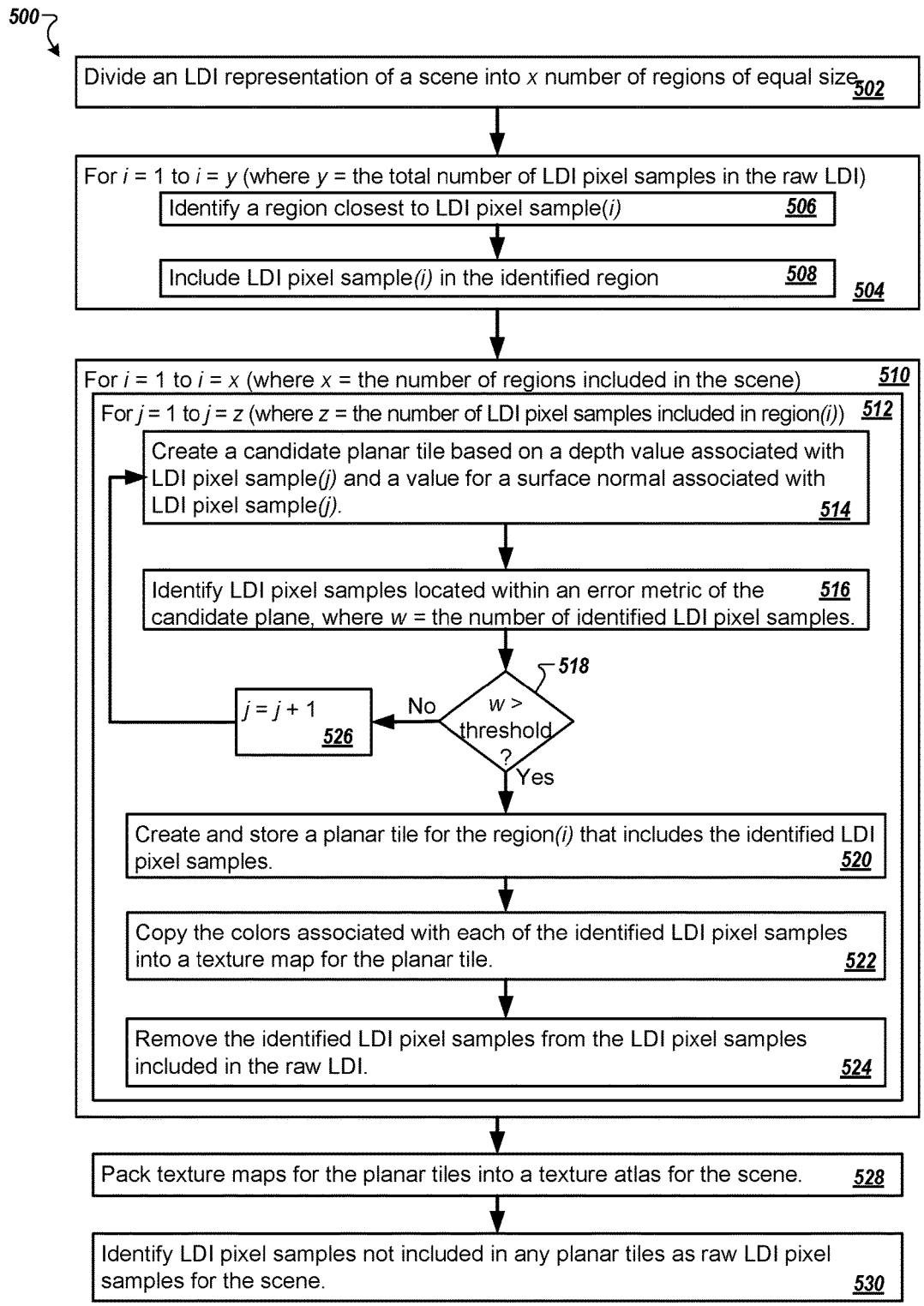
FIG. 5 is a flowchart of an example of a quadrangulation algorithm that can be used to identify and extract points from an LDI representation of a scene for inclusion in one or more planar tiles.

FIG. 5 is a flowchart of an example of a quadrangulation algorithm 500 that can be used to identify and extract points from an LDI representation of a scene for inclusion in one or more planar tiles. In some implementations, the systems, methods, algorithms, and processes described herein can implement the algorithm 500. For example, the algorithm 500 can be described referring to FIGS. 1A-D, 2, 3, and 4. In particular, referring to FIG. 2, the algorithm 500 may be performed (run, executed) by the LDI optimization application 240.

An LDI representation of a scene (e.g., a raw LDI) is divided into (split into) a particular number of regions (e.g., areas) (e.g., x number of regions of equal size (block 502). For each LDI pixel sample (e.g., y number of LDI pixel samples where y is equal to a total number of LDI pixel samples in the raw LDI) (block 504), a region closest to the LDI pixel sample is identified (block 506) and the LDI pixel sample is included in the identified region (block 508). Once completed, each LDI pixel sample will be included in a region. The selection of the particular number of regions can be based on an optimum number of quadrilaterals that a GPU can efficiently render in real-time in a 3D VR space. The selection of the size of a region can be based on a resolution desired for the rendering of images (or scenes) in the 3D VR space. In addition, a number of LDI pixel samples that can be gathered (obtained) for a scene can also be taken into consideration.

In some implementations, each region may be of different sizes. For example, a region located in a particular part of a scene (e.g., the center) may be smaller than a region located in another part of the scene (e.g., the edges).

For each region (e.g., x number of regions) (block 510) and for each LDI pixel sample included in the region (e.g., where z is equal to a number of LDI pixel samples included in a region) (block 512), a candidate planar tile is created for a particular LDI pixel sample included in the LDI pixel samples that are included in a particular region (block 514). The candidate planar tile is created based on a depth value associated with a particular LDI pixel sample and based on a value for a surface normal associated with the particular LDI pixel sample. Once a candidate planar tile is created for the particular region, a number of LDI pixels samples, w, is identified. The identified LDI pixel samples are LDI pixel samples in the particular region that are closest to the candidate planar tile that are within an error metric (block 516). It is then determined if the number of the identified LDI pixel samples, w, is greater than a threshold number of pixel samples (block 518).

If the number of the identified LDI pixel samples, w, is greater than the threshold number of pixel samples, a planar tile for the particular region that includes the identified LDI pixel samples is created and stored (block 520). The candidate planar tile is stored as a planar tile for use in the representation of the LDI. For example, the planar tile can be stored in the GPU buffer 234. In addition, a value for the origin of the planar tile in the LDI representation of the scene is stored in association with the planar tile. In addition, a value for a size of the planar tile (e.g., the size of a planar tile can be 16 points by 16 points) is stored in association with the planar tile. In addition, a value for a depth associated with each point that is located at each corner of the planar tile is stored in association with the planar tile. For example, the value for the depth associated with each corner point can be a distance between the point and a camera or viewpoint.

The colors associated with each of the identified LDI pixel samples are copied into a texture map for the planar tile (block 522). Each of the identified LDI pixel samples are remove from the LDI pixel samples included in the raw LDI (block 524).

If the number of the identified LDI pixel samples, w, is not greater than the threshold number of pixel samples, a candidate planar tile is then created for a next LDI pixel sample included in the LDI pixel samples included in the particular region (block 526 to block 514).

Once each LDI pixel sample in each region has been accounted for, what remains are a number of planar tiles that is equal to or less than the number of regions included in the scene (e.g., x number of regions) and any LDI pixel samples that were not included in a planar tile. Once each LDI pixel sample in each region has been accounted for, texture maps for the created planar tiles are packed into a texture atlas for the scene (block 528). For example, the texture atlas can be stored in the GPU buffer 234 in association with the planar tile representation of the LDI. LDI pixel samples that are not included in any of the created planar tiles are identified as raw LDI pixel samples for the scene (block 530). For example, the LDI pixel samples are stored in the GPU buffer 234 in association with the planar tile representation of the LDI.

In some implementations, a threshold number of LDI pixel samples can be determined based on a desired accuracy of the representation of the scene when the planar tiles are used to redraw the scene. For example, a threshold number of LDI pixel samples can be determined in order to guarantee a crack-free rendering of the scene. When drawing (redrawing) the scene, the placement and redrawing of the planar tiles in the LDI representation of the scene should be such that when each planar tile is drawn as two triangles, the vertices of the triangles should align with LDI pixel sample boundaries in the space of the LDI representation of the scene. A user viewing the redrawn scene may perceive any misalignment as a "crack" in the scene. In addition or in the alternative, the threshold number of LDI pixel samples can be determined based on a desired or target amount of data that can be stored in a buffer (e.g., the GPU buffer 234 as shown in FIG. 2).

In some implementations, an error metric can provide a boundary within which to include created planar tiles. For example, as a user immersed in a VR space changes a view or perspective of a 3D scene in the VR space, a quadangulation algorithm can efficiently process an LDI representation of the scene to render the perspectives of the 3D scene in real-time in the VR space within an error metric of a headbox. For example, a headbox can be a region around an original camera position (e.g., the position 308 of the camera 306 as shown in FIG. 3) where an LDI representation of a scene can be considered valid. It can be assumed that a viewer of the scene in the VR space never moves outside of the headbox. Therefore, if the projected location of an LDI pixel sample in a planar tile as compared to the original location of the LDI pixel sample is above a particular threshold value, the LDI pixel sample will not be included in the planar tile.

When drawing (redrawing) an LDI representation of a scene, a GPU (e.g., the GPU 218 as shown in FIG. 2) can rasterize each planar tile and apply a color texture map included in the texture atlas to each rasterized planar tile. This results in reduced computational complexity when drawing an LDI representation of a scene in a 3D VR space in real-time.

Figure 6:
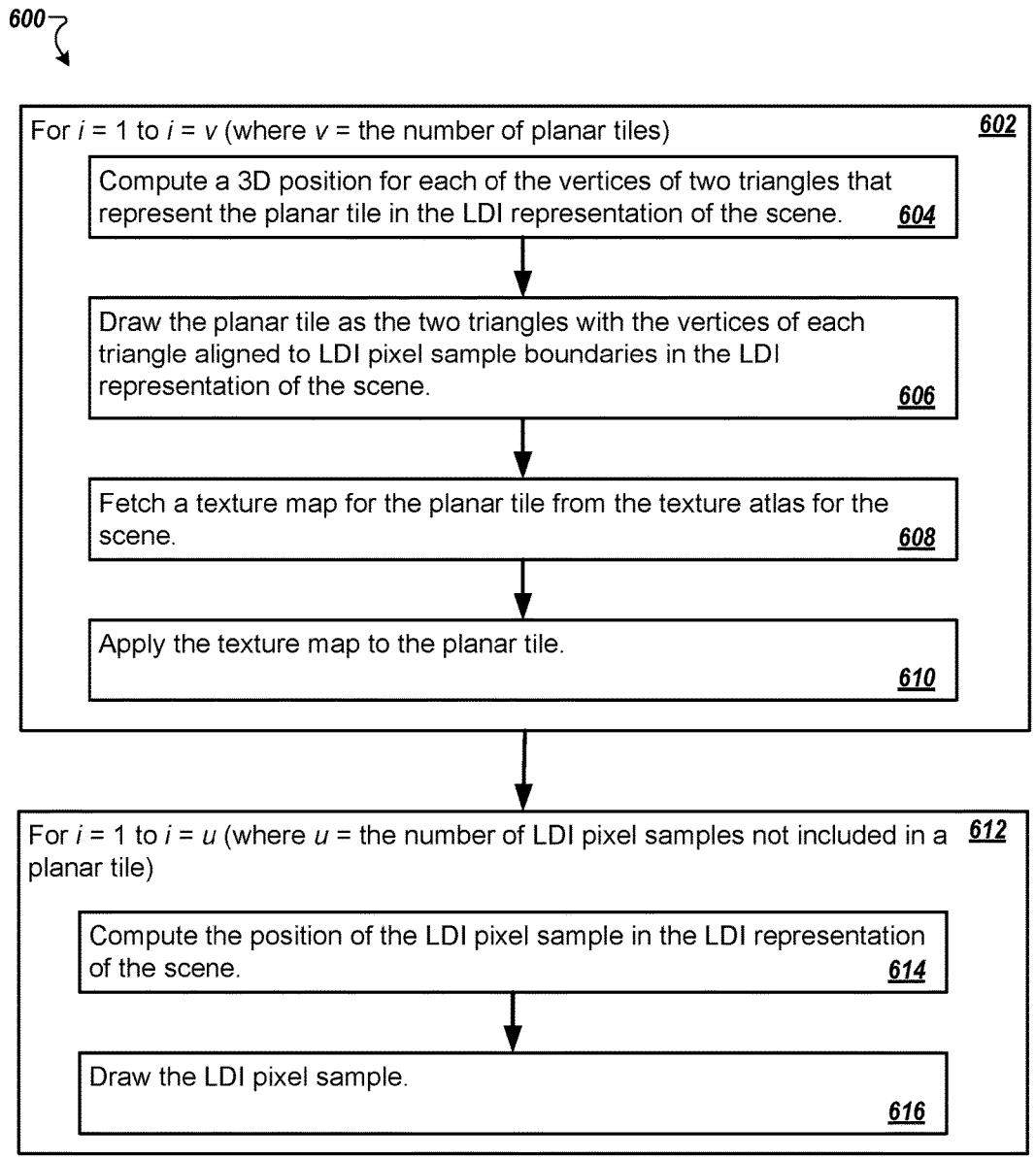
FIG. 6 is a flowchart of an example of algorithm that can be used to draw (redraw) an LDI representation of a scene that includes one or more planar tiles.

FIG. 6 is a flowchart of an example of algorithm 600 that can be used to draw (redraw) an LDI representation of a scene that includes one or more planar tiles. The algorithm 600 can be used to draw (redraw) an LDI representation of a scene that was partitioned using a partitioning algorithm 500 (as described with reference to FIG. 5) or a partitioning algorithm 800 (as described with reference to FIGS. 8A-C). In some implementations, the systems, methods, algorithms, and processes described herein can implement the algorithm 600. For example, the algorithm 600 can be described referring to FIGS. 1A-D, 2, 3, and 4. In particular, referring to FIG. 2, the algorithm 600 may be performed by the LDI optimization application 240.

For each planar tile (e.g., v number of planar tiles) (block 602), a 3D position for each of the vertices of two triangles that represent the planar tile in the LDI representation of the scene can be computed (block 604). The 3D positions can be calculated using values stored in association with the planar tile. The 3D positions can be calculated using the value for the origin of the planar tile in the LDI representation of the scene, the value for the size of the planar tile, and the value for the depth associated with each point that is located at each corner of the planar tile. In addition, the 3D positions can be calculated using a projection matrix for the LDI representation of the scene. The projection matrix can project each of the vertices of the two triangles that represent the planar tile in the LDI representation of the scene into the 3D VR space that includes the LDI representation of the scene.

The planar tile can be drawn as the two triangles with the vertices of each triangle aligned to LDI pixel sample boundaries in the LDI representation of the scene (block 606). A texture map for the planar tile is fetched (obtained, accessed, retrieved) from the texture atlas for the scene (block 608). The texture map is applied to the planar tile (block 610).

Once each planar tile has been drawn, for each LDI pixel sample associated with the planar tile representation of the scene that was not included in a planar tile (block 612), a position of the LDI pixel sample in the LDI representation of the scene is computed (block 614). The LDI pixel sample is drawn (block 616). Once each LDI pixel sample has been drawn, the drawing (redrawing) of the LDI representation of the scene in the 3D VR space is complete.

For example, the algorithm 600 can be a two-pass algorithm (e.g., a soft-z algorithm). A two-pass algorithm can recognize the mixing of planar tiles and LDI sample points when redrawing the LDI representation of the scene in the 3D VR space.

In some implementations, an iterative partitioning algorithm can randomly select a plurality of LDI pixel samples. The algorithm can tentatively consider the randomly selected plurality of LDI pixel samples as a plane. For example, the iterative partitioning algorithm can select a particular LDI pixel sample included in the plurality of LDI pixel samples. For example, the iterative partitioning algorithm can select an LDI pixel sample located within a center of the plurality of LDI pixel samples. For example, the iterative partitioning algorithm can select an LDI pixel sample considered a norm of the plurality of pixels. The iterative partitioning algorithm can search (and identify) LDI pixel samples in an area or neighborhood surrounding the selected LDI pixel sample when establishing or forming a plane.

In some implementations, criteria for an LDI pixel sample to be included in a surrounding neighborhood for the selected LDI pixel sample can be predetermined. For example, for an LDI pixel sample to be included in or to be considered a part of the neighborhood surrounding the selected LDI pixel sample, the LDI pixel sample may need to be within a particular error threshold (e.g., the further away from the selected LDI pixel sample the greater an error associated with a particular LDI pixel sample). The error threshold can be set so that arbitrarily large planes can be formed that can be used to render the 3D scene in real-time in the VR space. In addition, the iterative nature of the algorithm can refit planes within, for example, a predefined maximum number of planes. The refitting of the planes can determine a best-fit or best candidate for a particular set of pixel samples.

In contrast to a quadrangulation algorithm, a partitioning algorithm can cluster (gather, group) LDI pixel samples included in an LDI representation of a scene into one or more partitions, leaving no LDI pixel samples unaccounted for. As can be the case with the quadrangulation algorithm, the partitioning algorithm can be used as part of a larger image-processing pipeline that can process input scene (image) information and data (e.g., an LDI representation of the scene) into partitions that can each be turned into a texture-mapped polygon using, for example, RGBA textures (red, green, blue, alpha textures where alpha is an opacity channel).

Figure 7:
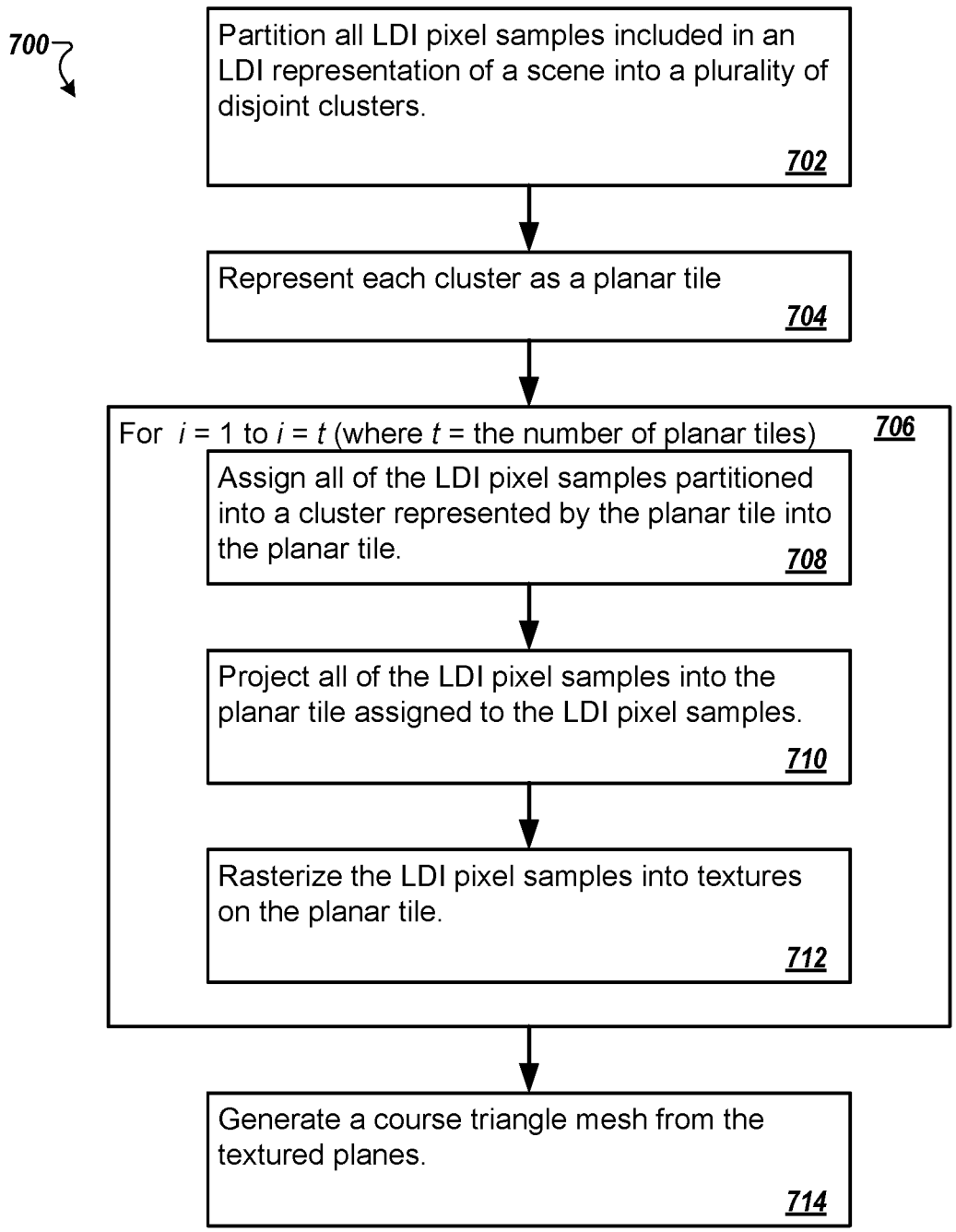
FIG. 7 is a flowchart of an example of a method that can use a partitioning algorithm to partition LDI pixel samples included in an LDI representation of a scene into a plurality of clusters.

FIG. 7 is a flowchart of an example of a method 700 that can use a partitioning algorithm 500 (as described with reference to FIG. 5) or a partitioning algorithm 800 (as described with reference to FIGS. 8A-C) to partition LDI pixel samples included in an LDI representation of a scene into a plurality of clusters or partitions. Each cluster can be considered a block of data. In some implementations, the systems, methods, and processes described herein can implement the method 700. For example, the method 700 can be described referring to FIGS. 1A-D, 2, 3, and 4. In particular, referring to FIG. 2, the method 700 may be performed by the LDI optimization application 240.

All LDI pixel samples included in an LDI representation of a scene are partitioned into a plurality of disjoint clusters (block 702). For example, partitioning algorithm 500 (as described with reference to FIG. 5) or partitioning algorithm 800 (as described with reference to FIGS. 8A-C) can be used. Each cluster is represented as a planar tile (block 704). For each planar tile (e.g., t number of planar tiles) (block 706), all of the LDI pixel samples partitioned into a cluster represented by the planar tile are assigned to the planar tile (block 708). All of the LDI pixel samples assigned to the planar tile are projected into the planar tile (block 710). The LDI pixel samples are rasterized into textures on the planar tile (block 712). A coarse triangle mesh is generated from the textured planes (block 714).

A partitioning algorithm can partition (segment) all of the LDI pixel samples included in an LDI representation of a scene, S, into a plurality of disjoint clusters (e.g., a disjoint set of clusters, C). Each individual cluster, c, is included in the disjoint set of clusters, C ($c \in C$). Each individual cluster, c, has an associated position (c.position), an associated normal vector (c.normal), and an associated set of samples, (c.samples $\subseteq$ S).

The partitioning algorithm works to minimize partitioning errors when assigning LDI pixel samples to clusters. In addition or in the alternative, the partitioning algorithm works to minimize the partitioning error when assigning parameters to each cluster.

In some implementations, Equation 1 can define a total partitioning error.

$$\Sigma_{s \in S} E(c,s).$$ Equation 1:

E(c,s) can define a measure on an error (an error metric) associated with assigning an LDI pixel sample, s, to a cluster, c. Equation 2 is an example equation for an error metric.

$$E(c, s) = \left( \frac{\|\Pi_{headbox}(c, s) - s.\text{position}\|}{\|\text{headbox.center} - c.\text{position}\|} \right)^2 + \lambda \left( \frac{\|\Pi_{headbox}(c, s) - c.\text{position}\|}{\|\text{headbox.center} - c.\text{position}\|} \right)^2$$ Equation 2

As described, a headbox can define a region of space (e.g., a bounding box or a sphere) from which an LDI representation of a scene can be viewed by a user while they are immersed in a 3D VR space. An s.position is a position of an LDI pixel sample, s, in the LDI representation of the scene. A c.position is a position of cluster, c, in the LDI representation of the scene. A headbox.center is a position of a point that is located at a center of the region of space defined as the headbox.

$\Pi_{headbox}(c,s)$ can define a projection of an LDI pixel sample, s, into a planar tile defined by a position of a cluster, c, where the cluster, c, is represented by the planar tile. The projection of the LDI pixel sample, s, into the planar tile can be further defined by a normal vector (c.normal) of the cluster, c. The projection of the LDI pixel sample, s, can be in a direction towards the center of the headbox. For example, the projection of an LDI pixel sample, s, into a planar tile can be defined by an intersection of a line segment (or vector) from the projection of an LDI pixel sample, s, into the planar tile (the s.position of the LDI pixel sample) to a center point or area of a headbox (the headbox.center). The planar tile is orthogonal to the normal vector (c.normal) and passes through the position of cluster (c.position).

A tuning parameter, $\lambda$, can identify a local importance of a cluster, c. For example, a value for the tuning parameter, $\lambda$, can be approximately 0.3.

Figure 8A:
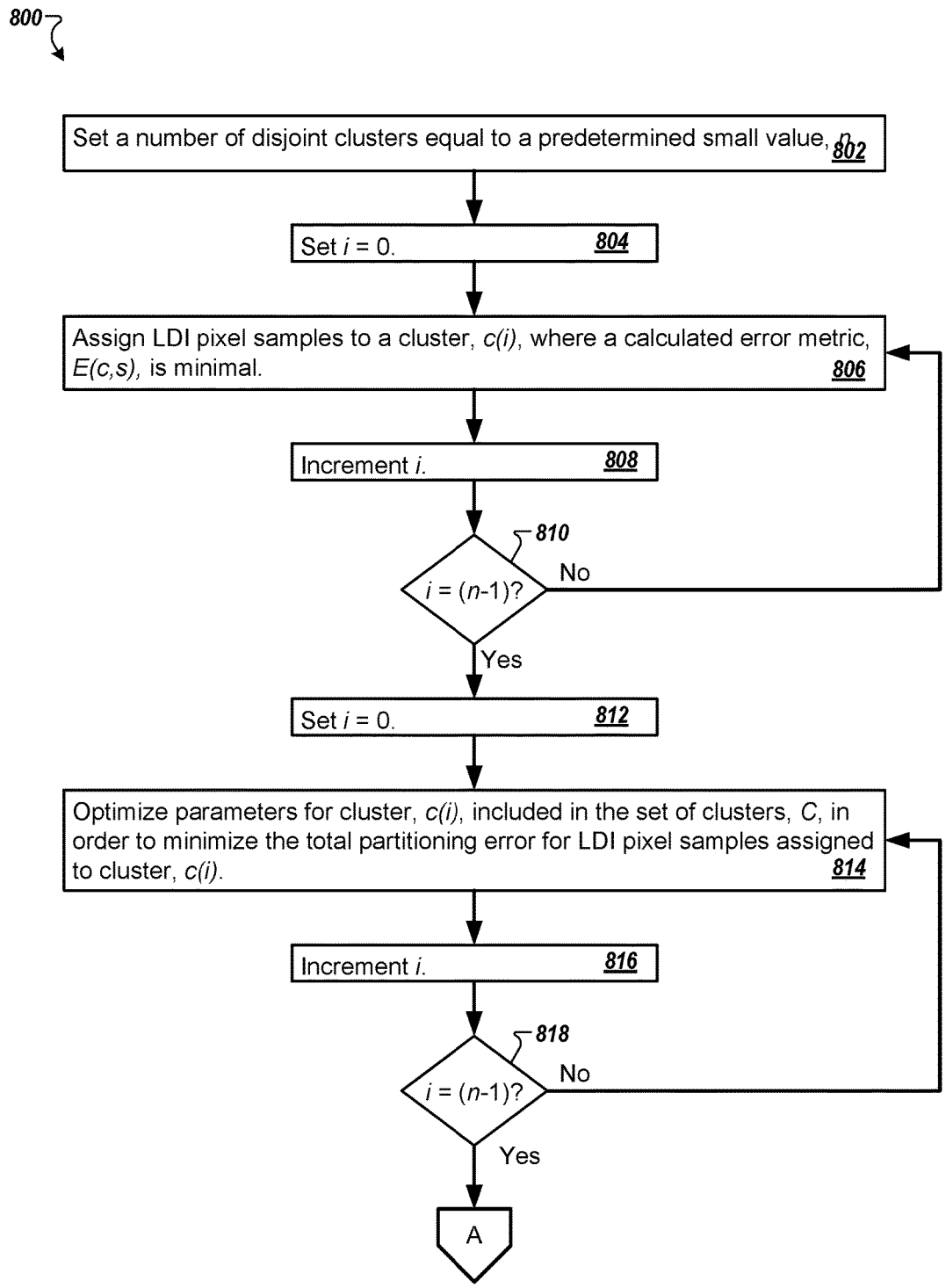
FIGS. 8A-C is a flowchart of an example of a partitioning algorithm that can be used to partition LDI pixel samples included in an LDI representation of a scene into a plurality of clusters.
Figure 8B:
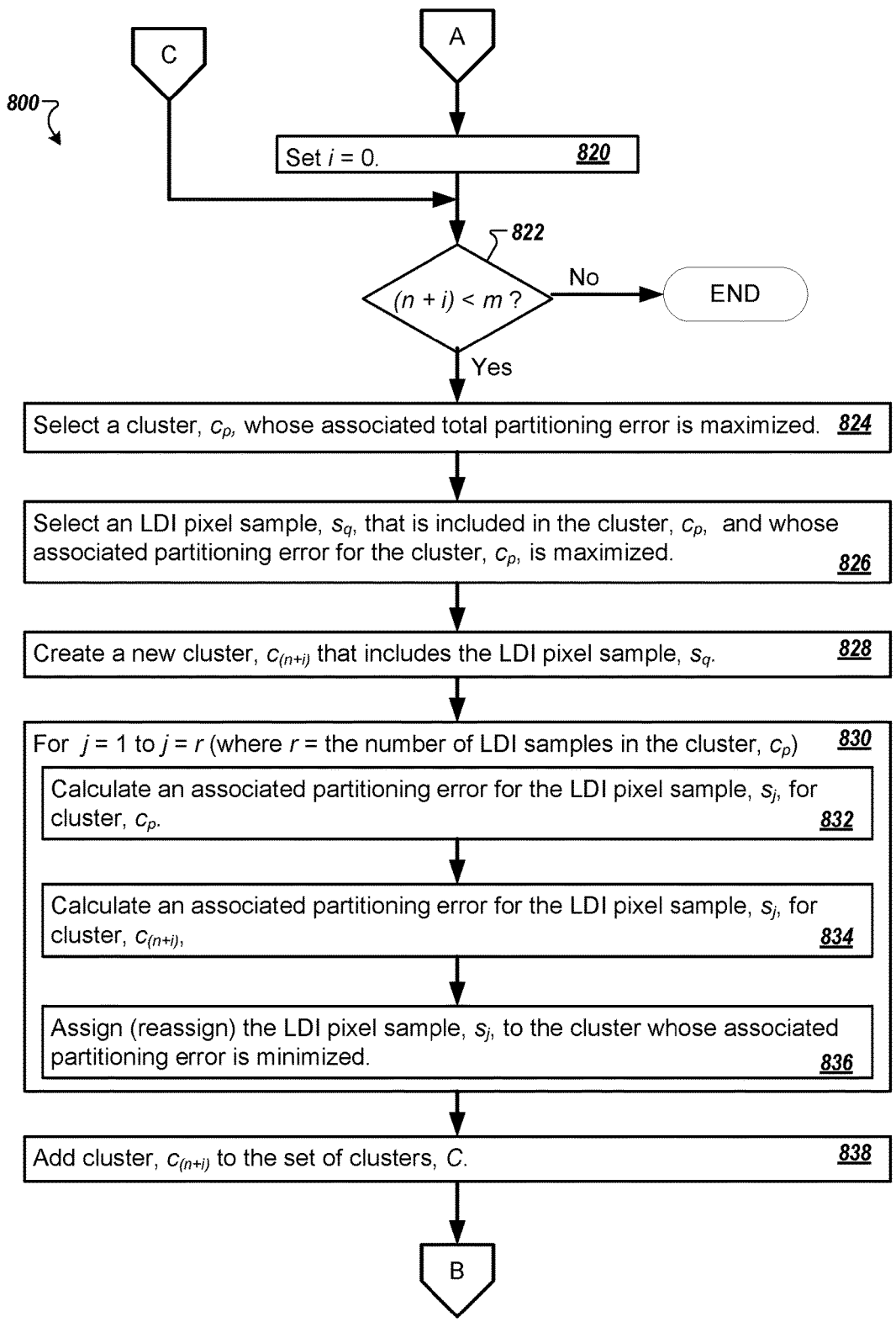
Figure 8C:
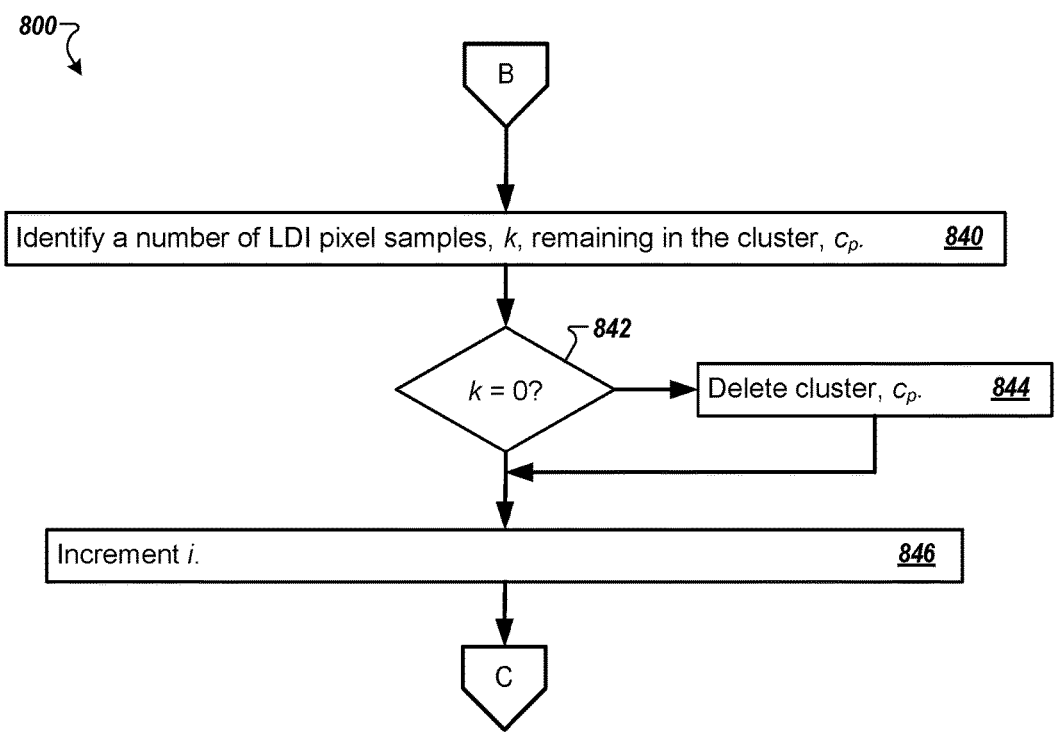

FIGS. 8A-C is a flowchart of an example of a partitioning algorithm 800 that can be used to partition LDI pixel samples included in an LDI representation of a scene into a plurality of clusters (as described with reference to FIG. 7 and specifically block 702). In some implementations, the systems, methods, algorithms, and processes described herein can implement the algorithm 800. For example, the algorithm 800 can be described referring to FIGS. 1A-D, 2, 3, and 4. In particular, referring to FIG. 2, the algorithm 800 may be performed by the LDI optimization application 240.

Referring to FIG. 7, all LDI pixel samples included in an LDI representation of a scene are partitioned into a plurality of disjoint clusters (block 702). The partitioning algorithm 800 can include multiple sequential steps that are executed in order to partition all LDI pixel samples included in the LDI representation of the scene into the plurality of disjoint clusters. The steps can include, but are not limited to, assignment steps (block 802, block 804, block 806, and block 808), update steps (block 812, block 814, and block 816), and subdivision steps (block 822, block 824, block 826, and block 828).

A first assignment step sets a total number of disjoint clusters, which the LDI pixel samples included in a raw LDI can be divided into, equal to a predetermined small number of clusters, n (block 802). An incremental value, i, for the set of clusters, C, that includes the n number of clusters, c, is set equal to zero (block 804). For example, all LDI pixel samples included in an LDI representation of a scene can be partitioned into n disjoint clusters (where, for example, n=50). Each cluster, c(i) (for i=0 to i=(n−1)), is included in a set of clusters, C (c(i)∈C). Each cluster, c(i), can be initialized using a position of a randomly selected LDI pixel sample included in the cluster, c(i), (the s.position of the randomly selected LDI pixel sample) and a surface normal for the randomly selected LDI pixel sample (s.normal). As described, a surface normal for a pixel sample (or point) can be a vector that is perpendicular to a tangent plane at the particular pixel sample (or point). The randomly selected LDI pixel sample can be the first LDI pixel sample assigned to (associated with) a particular cluster, c(i).

An LDI pixel sample can be assigned to the cluster where the calculated error metric is minimal (e.g., the smallest calculated error metric as compared to the calculated error metric for the LDI pixel sample when assigned to other clusters). An LDI pixel sample, s, is assigned to the cluster, c(i), if the calculated error metric, E(c,s), for the LDI pixel sample, s, as assigned to (placed in) the cluster, c(i), is the smallest calculated error metric as compared to the calculated error metric for the LDI pixel sample s, as assigned to (placed in) clusters other than cluster, c(i) (block 806). As such, the partitioning algorithm 800 can minimize partitioning errors when assigning LDI pixel samples to clusters by keeping the calculated error metric, E(c,s), for the LDI pixel sample, s, in the cluster, c(i), at a minimum.

A value for the predetermined error metric threshold value, ErrThreshold, can be determined based on a desired accuracy for the redrawn scene. In addition or in the alternative, a value for the predetermined error metric threshold value, Err Threshold, can be determined based on a boundary set by a headbox. In addition or in the alternative, the calculated error metric, E(c,s)<the predetermined error metric threshold value, Err Threshold.

The incremental value, i, for the set of clusters, C, that includes the n number of clusters, c, is incremented (block 808). The parts of the algorithm as recited in block 806 and block 808 are repeated until, in block 810, it is determined that i=(n−1), and the algorithm 800 continues to block 812.

In some implementations, calculating the error metric, E(c,s), for all LDI pixel samples included in an LDI representation of a scene (e.g., a raw LDI) for all clusters (c(i) to c(n)) can be a costly process for a computing device (e.g., the computing device 200 in FIG. 2). The efficiency and speed of the process can be impacted because of the amount of resources (e.g., the CPU 216, the GPU 218, the memory 236) needed and the amount of time the resources may need to be utilized in order to perform the partitioning.

In some implementations, a faster and less costly approach for assigning LDI pixel samples to clusters can include identifying, for a particular LDI pixel sample, s, only a k number of clusters, $C_k$, whose position, c.position, is closest to a position, s.position, of the particular LDI pixel sample, s. Of the k number of identified clusters, $C_k$, the particular LDI pixel sample, s, can be considered for inclusion in (can be assigned to) the cluster, c, because the calculated error metric is minimal (e.g., the smallest calculated error metric as compared to the calculated error metric for the LDI pixel sample when assigned to other of the k number of clusters, $C_k$). An LDI pixel sample, s, is assigned to the cluster, c(i), where c(i) is included in the k number of clusters, $C_k$, (c(i)∈$C_k$), if the calculated error metric, E(c,s), for the LDI pixel sample, s, as assigned to (placed in) the cluster, c(i), is the smallest calculated error metric as compared to the calculated error metric for the LDI pixel sample s, as assigned to (placed in) clusters other than cluster, c(i).

In some cases, for example, k can be equal to sixteen. Identifying a k number of clusters whose position, c.position, is closest to a position, s.position, of the particular LDI pixel sample, s, can be done efficiently by constructing a spatial partitioning data structure (e.g., a k-dimensional tree (a k-d tree)). The spatial partitioning data structure can be constructed using all of the cluster centers before the start of the assignment of the LDI pixel samples to any of the clusters. For example, before the start of the assignment of the LDI pixel samples to any of the clusters, the partitioning algorithm can determine a center point for each cluster (e.g., c(i).center).

An incremental value, i, for the set of clusters, C, that includes the n number of clusters, c, is set equal to zero (block 812). The parameters for cluster, c(i), included in the set of clusters, C, are optimized in order to minimize a total partitioning error for LDI pixel samples assigned to cluster, c(i).

In some implementations, a total partitioning error for LDI pixel samples assigned to a cluster, c(i), can be minimized using convex optimization methods (e.g., a Levenberg-Marquardt algorithm (LMA), a damped least-squares (DLS) algorithm). A convex optimization method can use, for each individual cluster, c(i), included in the disjoint set of clusters, C (c(i)∈C) that includes n clusters, an associated normal vector (c(i).normal) for a particular cluster, c(i), and a weighted average of sample positions for the particular cluster, c(i), as initial conditions in order to determine a best position and a best normal vector for each cluster, c(i), when used to represent the raw LDI. The best position and best normal vector for a cluster, c(i), will result in minimizing a total partitioning error for the LDI pixel samples assigned to cluster, c(i).

The incremental value, i, for the set of clusters, C, that includes the n number of clusters, c, is incremented (block 816). The parts of the algorithm as recited in block 814 and block 816 are repeated until, in block 818, it is determined that i=(n−1), and the algorithm 800 continues to block 820.

Next, the partitioning algorithm 800 iteratively increases the total number of clusters included in the disjoint set of clusters, C, from being equal to the predetermined small number of clusters, n, up to a maximum number of clusters (a maximum target cluster count, m). For example, a total number of clusters, n+i, can be continuously increased (from i=0 to i=(m−n−1)) up to the maximum target cluster count, m, by iteratively (repeatedly) splitting existing clusters.

In some implementations, a priority queue of clusters can be maintained that includes the total number of clusters included in the set of disjoint clusters, C. The clusters included in the priority queue can be ordered according to a total partitioning error (e.g., see Equation 1). The queue can be updated to include additional clusters that are created as a result of the splitting of an existing cluster. Included in the total partitioning error for a cluster, c(i) where c(i)∈C, is an error metric, E(c(i),s(j)), that is associated with each LDI pixel sample, s(j), where 0≤j<the total number of LDI pixel samples associated with (assigned to) the cluster c(i) (e.g., see Equation 2). For example, referring to FIG. 2, the LDI optimization application 240 can run (execute) the partitioning algorithm 800, creating, maintaining, and updating a priority queue of clusters in the GPU buffer 234. In some implementations, the maximum target cluster count, m, can be determined based on a maximum number of blocks of data that the GPU 218 can render efficiently. In addition, the maximum target cluster count, m, can be further based on an amount of GPU buffer memory (e.g., the GPU buffer 234) included in a computing device. For example, a value for m can be between 3,000 and 20,000.

An incremental value, i, is set equal to zero (block 820). If it is determined that (n+i)<m (where n is equal to the predetermined small number of clusters and m is equal to a maximum target cluster count) (block 822), a cluster, $c_p$, (where $c_p$∈C and 0<p≤(n+i−1)) is selected whose associated total partitioning error, $\Sigma_{s \in c_p.samples} E(c_p,s)$, is maximized, where $c_p$.samples is the set of LDI pixel samples associated with (included in) the cluster, $c_p$ (block 824). For example, the partitioning algorithm 800 can access the priority queue of clusters to determine that the cluster, $c_p$, has an associated total partitioning error that is greater than (or equal to) the partitioning error associated with other clusters included in the priority queue. An LDI pixel sample, $s_q$, that is included in the cluster, $c_p$, ($s_q \in c_p$.samples) and whose associated partitioning error for the cluster, $c_p$, is maximized, is selected (block 826). A new cluster, $c_{(n+i)}$, is created that includes the LDI pixel sample, $s_q$ (block 828). The cluster, $c_{(n+i)}$, has an associated position $c_{(n+i)}$.position=$s_q$.position, an associated normal vector, $c_{(n+i)}$.normal=$s_q$.normal, and an associated set of samples, $c_{(n+i)}$.samples, that initially includes LDI pixel sample, $s_q$.

For each LDI pixel sample included in the cluster, $c_p$, (with the exception of LDI pixel sample, $s_q$, (e.g., r number of LDI pixel samples)) (block 830), an associated partitioning error for the LDI pixel sample, $s_j$, where 0<j<(r−1) and j≠q, for cluster, $c_p$, is calculated (e.g., $E(c_p,s_j)$) (block 832). An associated partitioning error for the LDI pixel sample, $s_j$, for cluster, $c_{(n+i)}$, is calculated (e.g., $E(c_{(n+i)},s_j)$) (block 834). The LDI pixel sample, is assigned (reassigned) to the cluster whose associated partitioning error is minimized (block 836). For example, if $E(c_{(n+i)},s_j)<E(c_p,s_j)$ LDI pixel sample, $s_j$, is reassigned to cluster, $c_{(n+i)}$. The LDI pixel sample, $s_j$, will no longer be associated with (included in) the cluster, $c_p$, and is now associated with (included in) the cluster, $c_{(n+i)}$. In another example, if $E(c_{(n+i)},s_j) \geq E(c_p,s_j)$ LDI pixel sample, will remain associated with (included in) the cluster, $c_p$.

Once associated partitioning errors for all of the LDI pixel samples included in the cluster, $c_p$, have been calculated and compared to calculated partitioning errors for all of the LDI pixel samples if they were to be included in the cluster, $c_{(n+i)}$, the cluster, $c_{(n+i)}$, is included in (added to) the set of clusters, C, ($c_{(n+i)}$∈C) (block 838). For example, the priority queue of clusters is increased by an additional cluster. The number of LDI pixel samples included in (remaining in) the cluster, $c_p$, is identified (block 840). If the number of LDI pixel samples included in (remaining in) the cluster, $c_p$, is equal to zero (block 842), the cluster, $c_p$, is deleted and removed from the priority queue of clusters (block 844). If the number of LDI pixel samples included in (remaining in) the cluster, $c_p$, is not equal to zero (block 846), the cluster, $c_p$, remains in the priority queue of clusters.

The incremental value, i, is incremented (block 816). The partitioning algorithm 800 continues to block 822. If it is determined that (n+i)<m (block 822), the steps in block 830 (the steps in block 832, the steps in block 834, and the steps in block 836), and the steps in blocks 838 to 846 are repeated. If it is determined that (n+i) is not <m (block 822), the partitioning algorithm 800 ends.

FIG. 9 is a flowchart that illustrates a method 900 for rendering a layered depth image (LDI) representation of a scene as a three-dimensional (3D) image in a virtual reality (VR) space. In some implementations, the systems, methods, algorithms, and processes described herein can implement the method 900. For example, the method 900 can be described referring to FIGS. 1A-D, 2, 3, 4, 5, 6, 7, and 8A-C.

A plurality of pixel samples included in a layered depth image (LDI) representation of a scene for rendering in a three-dimensional (3D) image in a virtual reality (VR) space can be identified (block 902). For example, referring to FIG. 2 and as described herein, the VR application 220 executing (running) on the computing device 200 can identify the plurality of LDI pixel samples. A subset of the plurality of pixel samples are grouped into a block of data (block 904). For example, referring to FIG. 2 and as described herein, the LDI optimization application 240 can group a subset of the plurality of LDI pixel samples into a block of data (e.g., into a cluster). The grouping can include extracting the subset of the plurality of pixel samples from the LDI representation of the scene for inclusion in the block of data based on a proximity of the subset of the plurality of pixel samples to one another.

A texture map for a block of data is created (block 906). The texture map can be associated with the block of data. For example, referring to FIG. 2 and as described herein, the LDI optimization application 240 can create the texture map, associating the texture map with the block of data. The block of data and the associated texture map are stored (block 908). For example, referring to FIG. 2 and as described herein, the LDI optimization application 240 can store the block of data and the associated texture map in the GPU buffer 234. The 3D image can be rendered in the VR space using the block of data and the associated texture map (block 910). For example, referring to FIG. 2 and as described herein, the GPU 218 can render the block of data and the associated texture map, providing the rendering to the display interface 238 for display on the screen 202 as a 3D image in a VR space.

Figure 10:
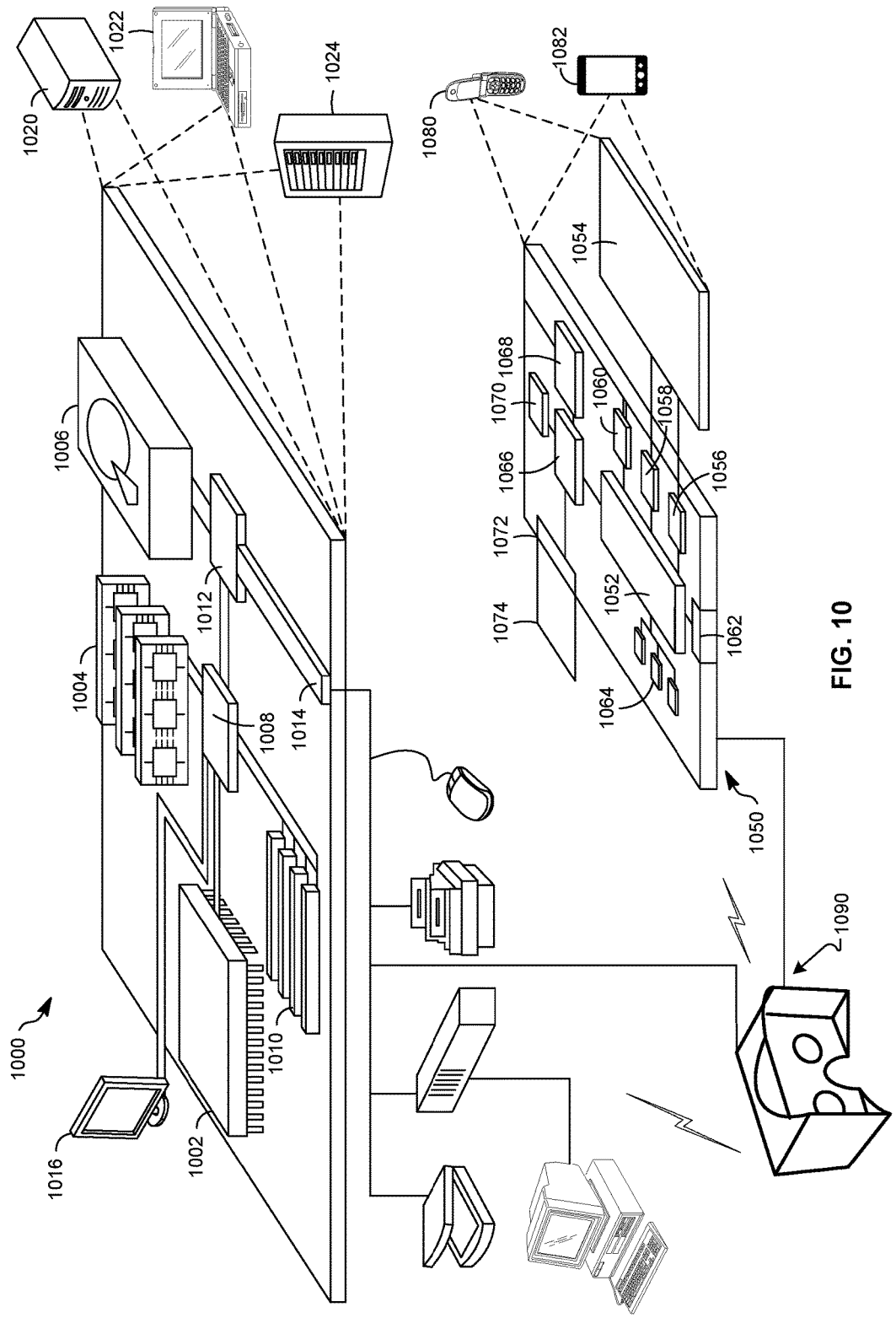
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (HMD device 1090). For example, one or more sensors included on a computing device 1050 or other computing device depicted in FIG. 10, can provide input to HMD device 1090 or in general, provide input to a VR environment. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR environment that can then be used as input to the VR environment. For example, the computing device 1050 may be incorporated into the VR environment as a virtual object, such as a controller, a laser pointer, a keyboard, a weapon, etc. Positioning of the computing device or virtual object by the user when incorporated into the VR environment can allow the user to position the computing device to view the virtual object in certain manners in the VR environment. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR environment. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR environment can cause a particular action to occur in the VR environment.

In some implementations, a touchscreen of the computing device 1050 can be rendered as a touchpad in VR environment. A user can interact with the touchscreen of the computing device 1050. The interactions are rendered, in HMD device 1090 for example, as movements on the rendered touchpad in the VR environment. The rendered movements can control objects in the VR environment.

In some implementations, one or more output devices included on the computing device 1050 can provide output and/or feedback to a user of the HMD device 1090 in the VR environment. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR environment. In the example of the laser pointer in a VR environment, the computing device 1050 appears as a virtual laser pointer in the computer-generated, 3D environment. As the user manipulates the computing device 1050, the user in the VR environment sees movement of the laser pointer. The user receives feedback from interactions with the computing device 1050 in the VR environment on the computing device 1050 or on the HMD device 1090.

In some implementations, a computing device 1050 may include a touchscreen. For example, a user can interact with the touchscreen in a particular manner that can mimic what happens on the touchscreen with what happens in the VR environment. For example, a user may use a pinching-type motion to zoom content displayed on the touchscreen. This pinching-type motion on the touchscreen can cause information provided in the VR environment to be zoomed. In another example, the computing device may be rendered as a virtual book in a computer-generated, 3D environment. In the VR environment, the pages of the book can be displayed in the VR environment and the swiping of a finger of the user across the touchscreen can be interpreted as turning (flipping) a page of the virtual book. As each page is turned (flipped), in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR environment to control objects in the VR environment.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
identifying a plurality of pixel samples included in a layered depth image (LDI) representation of a scene for rendering in a three-dimensional (3D) image in a virtual reality (VR) space;
grouping, by a processor, a subset of the plurality of pixel samples into a block of data, the grouping including extracting each pixel sample included in the subset of the plurality of pixel samples from the LDI representation of the scene for inclusion in the block of data based on an error metric associated with the respective pixel sample, the error metric defining a boundary for inclusion in the block of data;
creating, by the processor, a texture map for a block of data, the texture map being associated with the block of data;
storing the block of data and the associated texture map; and
triggering a rendering of the 3D image in the VR space using the block of data and the associated texture map.

2. The method of claim 1, wherein the processor is a Graphics Processing Unit (GPU).

3. The method of claim 2, wherein triggering the rendering of the 3D image in the VR space using the block of data and associated texture map includes:
triggering a rasterizing of the block of data; and
triggering an applying of the associated texture map.

4. The method of claim 1, wherein the block of data is represented by a planar tile.

5. The method of claim 1, wherein grouping the subset of the plurality of pixel samples into the block of data further includes:
determining whether the error metric associated with the respective pixel sample is greater than an error threshold value; and
not including the pixel sample in the subset of the plurality of pixel samples for grouping into the block of data based on determining that the error metric associated with the respective pixel sample is greater than the error threshold value.

6. The method of claim 5, wherein the error threshold value is based on a region around an original camera position where the LDI representation of the scene is considered valid.

7. The method of claim 1, further comprising:
optimizing, by the processor, parameters associated with the block of data, the optimizing minimizing a total partitioning error for the subset of the plurality of pixel samples included in the block of data.

8. The method of claim 1, wherein the grouping of the subset of the plurality of pixel samples is performed by a quadrangulation algorithm.

9. The method of claim 1, wherein the grouping of the subset of the plurality of pixel samples is performed by a partitioning algorithm.

10. A computing device comprising:
a screen configured to display image data;
a display interface configured to provide the image data to the screen;
a GPU buffer configured to store blocks of data; and
a graphics processing unit (GPU) configured to:
identify a plurality of pixel samples included in a layered depth image (LDI) representation of a scene for rendering in a three-dimensional (3D) image in a virtual reality (VR) space;
group a subset of the plurality of pixel samples into a block of data, the grouping including extracting each pixel sample included in the subset of the plurality of pixel samples from the LDI representation of the scene for inclusion in the block of data based on an error metric associated with the respective pixel sample, the error metric defining a boundary for inclusion in the block of data;
create a texture map for a block of data, the texture map being associated with the block of data;
store the block of data and the associated texture map in the GPU buffer;
trigger a rendering of the 3D image in the VR space, the rendering including:
rasterizing the block of data; and
applying the associated texture map; and
provide the rendered 3D image to the display interface as the image data for display on the screen.

11. The computing device of claim 10, wherein the block of data is represented by a planar tile.

12. The computing device of claim 10, wherein grouping the subset of the plurality of pixel samples into the block of data further includes:
determining whether the error metric associated with the respective pixel sample is greater than an error threshold value;
including the pixel sample in the subset of the plurality of pixel samples for grouping into the block of data based on determining that the error metric associated with the respective pixel sample is not greater that the error threshold value; and
not including the pixel sample in the subset of the plurality of pixel samples for grouping into the block of data based on determining that the error metric associated with the respective pixel sample is greater than the error threshold value.

13. The computing device of claim 12, wherein the error threshold value is based on a region around an original camera position where the LDI representation of the scene is considered valid.

14. The computing device of claim 10, wherein the GPU is further configured to:
optimize parameters associated with the block of data, the optimizing minimizing a total partitioning error for the subset of the plurality of pixel samples included in the block of data.

15. The computing device of claim 10, wherein the GPU is further configured to:
perform a quadrangulation algorithm when grouping the subset of the plurality of pixel samples into the block of data.

16. The computing device of claim 10, wherein the GPU is further configured to:
perform a partitioning algorithm when grouping the subset of the plurality of pixel samples into the block of data.

17. A non-transitory machine-readable medium having instructions stored thereon, the instructions, when executed by one or more processors, cause a computing device to:
identify, by the computing device, a plurality of pixel samples included in a layered depth image (LDI) representation of a scene for rendering in a three-dimensional (3D) image in a virtual reality (VR) space;
group a subset of the plurality of pixel samples into a block of data, the grouping including extracting each pixel sample included in the subset of the plurality of pixel samples from the LDI representation of the scene for inclusion in the block of data based on an error metric associated with the respective pixel sample, the error metric defining a boundary for inclusion in the block of data;
create a texture map for the block of data, the texture map being associated with the block of data;
store the block of data and the associated texture map; and
trigger, by the computing device, a rendering of the 3D image in the VR space using the block of data and the associated texture map.

18. The medium of claim 17, wherein the grouping of the subset of the plurality of pixel samples is performed by one of a quadrangulation algorithm or a partitioning algorithm.

19. The medium of claim 17, wherein the instructions, when executed by the one or more processors, that cause the computing device to group a subset of the plurality of pixel samples into a block of data further includes instructions that when executed by the one or more processors cause the computing device to:
calculate an error threshold value based on a region around an original camera position where the LDI representation of the scene is considered valid; and
not include a pixel sample in the subset of the plurality of pixel samples for grouping into the block of data based on determining that the error metric for the pixel sample is greater than the error threshold value.

20. The medium of claim 17, wherein the instructions, when executed by the one or more processors, further cause the computing device to:
optimize parameters associated with the block of data, the optimizing minimizing a total partitioning error for the subset of the plurality of pixel samples included in the block of data.

* * * * *